(12) United States Patent
Gastineau et al.

(10) Patent No.: US 8,577,787 B1
(45) Date of Patent: *Nov. 5, 2013

(54) METHODS, SYSTEMS, AND COMPUTER PROGRAM PRODUCTS FOR OBTAINING BEST EXECUTION OF ORDERS TO BUY OR SELL A FINANCIAL INSTRUMENT FOR WHICH A NET ASSET VALUE IS PERIODICALLY CALCULATED

(71) Applicant: Navigate Fund Solutions LLC, Boston, MA (US)

(72) Inventors: Gary L. Gastineau, Short Hills, NJ (US); Todd J. Broms, New York, NY (US)

(73) Assignee: Navigate Fund Solutions LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,780

(22) Filed: Oct. 10, 2012

Related U.S. Application Data

(62) Division of application No. 12/425,044, filed on Apr. 16, 2009, now Pat. No. 8,306,901.

(51) Int. Cl.
*G06Q 40/00* (2012.01)
(52) U.S. Cl.
USPC .......................................................... 705/37
(58) Field of Classification Search
USPC ....................................................... 705/35–45
See application file for complete search history.

(56) References Cited

U.S. PATENT DOCUMENTS

| | | | |
|---|---|---|---|
| 5,806,048 A | 9/1998 | Kiron et al. | |
| 5,845,266 A | 12/1998 | Lupien et al. | |
| 5,946,667 A | 8/1999 | Tull et al. | |
| 5,983,204 A | 11/1999 | Debe | |
| 6,012,046 A | 1/2000 | Lupien et al. | |
| 6,029,146 A | 2/2000 | Hawkins et al. | |
| 6,088,685 A | 7/2000 | Kiron et al. | |
| 6,098,051 A | 8/2000 | Lupien et al. | |
| 6,236,972 B1 | 5/2001 | Shkedy | |
| 6,418,419 B1 | 7/2002 | Nieboer et al. | |
| 6,564,192 B1 | 5/2003 | Kinney, Jr. et al. | |
| 6,633,949 B2 | 10/2003 | Kuo et al. | |
| 6,879,964 B2 * | 4/2005 | Sauter et al. | 705/37 |
| 6,941,280 B1 * | 9/2005 | Gastineau et al. | 705/36 R |
| 7,024,387 B1 | 4/2006 | Nieboer et al. | |
| 7,031,937 B2 * | 4/2006 | Brown et al. | 705/36 T |
| 7,047,218 B1 | 5/2006 | Wallman | |
| 7,099,838 B1 * | 8/2006 | Gastineau et al. | 705/35 |

(Continued)

OTHER PUBLICATIONS

Robinson, Sara, "Amex Considers Mutual Fund Trading", New York Times (Late Edition (East Coast)). New York, N.Y., Sep. 19, 1999, pp. 1-3.*

(Continued)

*Primary Examiner* — Mohammad Z Shaikh
(74) *Attorney, Agent, or Firm* — Sampson & Associates, P.C.

(57) ABSTRACT

The present invention uses new order entry types (formats) and new order management methods to meet the order and transaction management needs of investors, traders, brokers, market makers and service providers for institutional traders for transactions in NAV Instruments by integrating the implementation of trades when conventional markets and NAV-based trading markets operate contemporaneously. Among other features, the invention provides methods and computer systems for determining the appropriate nature, size, sequence and latency of orders to be entered into alternative trading venues to improve executions.

37 Claims, 11 Drawing Sheets

(56) References Cited

U.S. PATENT DOCUMENTS

| | | | |
|---|---|---|---|
| 7,110,974 B1 | 9/2006 | Rust | |
| 7,167,837 B1* | 1/2007 | Ciampi et al. | 705/35 |
| 7,283,978 B2* | 10/2007 | Frankel et al. | 705/35 |
| 7,305,362 B2* | 12/2007 | Weber et al. | 705/36 R |
| 7,444,300 B1* | 10/2008 | Broms et al. | 705/35 |
| 7,496,531 B1* | 2/2009 | Gastineau et al. | 705/35 |
| 7,526,445 B2* | 4/2009 | MacQueen et al. | 705/36 R |
| 7,571,130 B2* | 8/2009 | Weber et al. | 705/36 R |
| 7,574,399 B2* | 8/2009 | Weber et al. | 705/37 |
| 7,599,873 B2* | 10/2009 | Brennan | 705/36 R |
| 7,636,682 B1* | 12/2009 | MacPherson | 705/37 |
| 7,689,501 B1 | 3/2010 | Gastineau et al. | |
| 7,739,186 B1* | 6/2010 | Gerber | 705/37 |
| 7,747,512 B2* | 6/2010 | Gastineau et al. | 705/37 |
| 7,970,687 B2* | 6/2011 | Gastineau et al. | 705/37 |
| 8,041,625 B2* | 10/2011 | Seale et al. | 705/37 |
| 8,073,757 B2* | 12/2011 | Baldassini et al. | 705/36 R |
| 8,170,934 B2* | 5/2012 | Weber et al. | 705/35 |
| 8,306,901 B1* | 11/2012 | Gastineau et al. | 705/37 |
| 2001/0025266 A1* | 9/2001 | Gastineau et al. | 705/36 |
| 2001/0042037 A1* | 11/2001 | Kam et al. | 705/36 |
| 2002/0128947 A1 | 9/2002 | Sauter et al. | |
| 2002/0194107 A1 | 12/2002 | Li et al. | |
| 2003/0177077 A1 | 9/2003 | Norman | |
| 2003/0177084 A1* | 9/2003 | Cassani et al. | 705/36 |
| 2003/0177086 A1 | 9/2003 | Gomber et al. | |
| 2003/0177126 A1 | 9/2003 | Weingard et al. | |
| 2003/0233302 A1 | 12/2003 | Weber et al. | |
| 2003/0233306 A1 | 12/2003 | Madhaven et al. | |
| 2004/0044609 A1 | 3/2004 | Moore | |
| 2004/0073506 A1 | 4/2004 | Tull, Jr. et al. | |
| 2004/0143525 A1 | 7/2004 | Nishimaki | |
| 2004/0186803 A1* | 9/2004 | Weber et al. | 705/35 |
| 2004/0210502 A1 | 10/2004 | Madhaven et al. | |
| 2004/0215549 A1 | 10/2004 | Madhavan et al. | |
| 2004/0236636 A1 | 11/2004 | Lutnick et al. | |
| 2004/0243502 A1 | 12/2004 | Slowik et al. | |
| 2005/0027638 A1 | 2/2005 | Ng et al. | |
| 2005/0038726 A1* | 2/2005 | Salomon et al. | 705/36 |
| 2005/0108146 A1 | 5/2005 | Bond | |
| 2005/0149426 A1 | 7/2005 | Jokisch et al. | |
| 2005/0262010 A1* | 11/2005 | Tull et al. | 705/37 |
| 2006/0026091 A1 | 2/2006 | Keen et al. | |
| 2006/0059078 A1 | 3/2006 | Courbois et al. | |
| 2006/0100955 A1* | 5/2006 | Baldassini et al. | 705/37 |
| 2006/0167786 A1 | 7/2006 | Gamir et al. | |
| 2006/0218075 A1* | 9/2006 | Feldman et al. | 705/37 |
| 2006/0253376 A1* | 11/2006 | Seale et al. | 705/37 |
| 2007/0027790 A1* | 2/2007 | Gastineau et al. | 705/36 R |
| 2007/0078738 A1* | 4/2007 | Levin et al. | 705/36 R |
| 2008/0091585 A1* | 4/2008 | MacQueen et al. | 705/36 R |
| 2008/0177676 A1* | 7/2008 | Weber et al. | 705/36 R |
| 2008/0195553 A1 | 8/2008 | Umlauf | |
| 2008/0313100 A1* | 12/2008 | Weber et al. | 705/36 R |
| 2009/0182684 A1 | 7/2009 | Shalen | |
| 2011/0047093 A1 | 2/2011 | Faust, Jr. et al. | |

OTHER PUBLICATIONS

Renberg, Werner, "A Fair Shake? Timers hate an alternative fund pricing system; supports say it evens the odds", Barron's, Feb. 16, 2004, pp. 1-2.*

Pomponio, Bozena, "Commentary: The new actively-managed exchange traded funds", Daily Record. Rochester, NY, Apr. 2, 2008, pp. 1-2.*

Moreau, Dan, "Can You Trust Your Fund's Net Asset Value?", Investor's Business Daily. Los Angeles, Jan. 11, 1999, pp. 1-2.*

Atkinson, Howard, "Built to trade, when you want: whether, you want to hold ETFs or fold them, walk away or run, you can do so at your discretion anytime the market is open", Money Digest (Online) 18.11, Nov. 2003, pp. 1-3.*

Atkinson, Howard, "ETFs offer real-time trade execution: a real plus in today's volatile markets", Money Digest 17.9 (Sep. 2002), pp. 1-2.*

"Nuveen Launches First Municipal Closed-End Exchange-Traded Fund Index; Index to be Calculated and Published by the American Stock Exchange", Business Wire. New York: Jul. 11, 2005, pp. 1-2.*

Engle, Robert; Sarkar, Debojyoti, "Premiums-discounts and exchange traded funds. (marketing)", Journal of Derivatives, v 13, n 4, pp. 1-20.*

Grinold, Richard C. and Ronald N. Kahn, 'Active Portfolio Management', Second Edition, (2000), McGraw-Hill. The whole book , Considered by Examiner in The Parent Case.

Harris, Larry., Trading and Exchanges: Market Microstructure for Practitioners, Oxford University Press, 2003. The whole book , Considered by Examiner in the Parent Case.

Bernstein, Peter, "What's it all About, Alpha?", Institutional Investor, May 2004, 48-52.

Chen,Joseph, Harrison Hong, Ming Huang and Jeffrey Kubik, "Does Fund Size Brode Performance? Liquidity, Organizational Diseconomies and Active Money Management," Working Paper, Sep. 2002 and May 2004 (available at http://www.rcf.use.edu~josephsc/files/fundsize.pdf).

Clark, Andrew, "For Benchmark-Beating Funds, Does Fund Size Affect Performance?", Lipper Research Study, Jan. 5, 2004 (available at http://www.researeh.lipper.wallst.com/researchStudiesOverview.asp).

Edelen, Roger M.,Investor Flows and the Assessed Performance of Open-End Mutual Funds, Journal of Financial Economics 53,1999, 439-466.

Gastineau, Gary L., The Exchange-Traded Funds Manual, 2002b, John Wiley & Sons. The whole book , Considered by Examiner in the Parent Case.

Gastineau, Gary L., "Protecting Fund Shareholders From Costly Share Trading," Financial Analysts Journal, May/Jun. 2004a, 22-32 (available at http://www.etfconsultants.com/Protecting%/20Fund%20Shareholders%20FAJ.pdf).

Greene, Jason T., and Charles W. Hodges, "The Dilution Impact of Daily Fund Flows on Open-End Mutual Funds," Journal of Financial Economics, vol. 65, No. 1, Jul. 2002, 131-158.

Gastineau, GaryL., and Craig J. Lazzara, "Reinventing the Investment Fund" fro The Investment Think Tank: Theory, Strategy, and Practice for Advisers. Harold Evensky and Deena Katz, editors, Bloomberg Press, 2004, 153-178. Also appeared in Bloomberg Wealth Manager under the title of "Extreme Makeover," Nov. 2004, 57-68.

Johnson, Wooddrow T., "Predictable Investment Horizons and Wealth Transfers among Mutual Fund Shareholders," Journal of Finance, Oct. 2004, 1979-2012.

Porter, Michael, "The Future is Now: The AMEX's Solution to the Active ETF Riddle," Lipper Fund Industry Insight Reports, Dec. 6, 2004, (available at http://www.research.lipper.wallst.com/fundIndustryOverview.asp;$15 payment required to view article).

Porter, Michael "Gary Gastineau on Why Actively-Managed Exchange-Traded Funds Can Be the Greatest Thing Since Money Market Funds," Lipper Fund Industry Insight Reports, Nov. 30, 2004, (available at http://www.research.lipper.wallst.com/fundIndustryOverview.asp, $15 payment required to view article).

Stein, Jerem C., "Why Are Most Funds Open-End? Competition and the Limits of Arbitrage," Working Pwer, Jan. 2004, Harvard University (available at http://post.economics.harvard.edu/faculty/stein/papers/OpenEndJanO4revision.pdf).

The NASDAQ Closing Cross, 2 pgs.

Baldwin, William, "How to Profit From Single-Stock Futures," Forbes Magazine (Apr. 7, 2010). http://www.forbes.com/2010/04/07/dividend-tax-futures-personal-finance-capital-gains.html.

Baldwin, William, "They're Clipping Your Dividends," Forbes Magazine, (Apr. 26, 2010). http://www.forbes.com/forbes/2010/0426/opinions-william-baldwin-obama-dividend-tax-side-lines.html.

Bookstaber Richard, A Demon of Our Own Design: Markets, Hedge Funds, and the Perils of Financial Innovation, Hoboken, NJ: John Wiley & Sons, 2007: 225-226.

Broms, T. J., and Gary L. Gastineau, "The Development of Improved Exchange-Traded Funds (ETFs) in the United States," In New Financial Instruments and Institutions, eds. Y. Fuchita and R. E. Litan. Washington, DC: The Brookings Institution, 193-209, and also in a

(56) References Cited

OTHER PUBLICATIONS

Guide to Exchange-Traded Funds and Indexing Innovations, 6th ed. New York: Institutional Investor (2007), 16-26. http://www.etfconsultants.com/images/Brookings_Institution_2.pdf.

Cano, Guillermo, Barry E. Feldman, and Joseph Smith, "ETFs, Swaps, and Futures: Trade at Index Close (TIC) and the Coevolution of Financial Markets," Institutional Investor, (Fall 2009): 50-58.

Dick, Dennis, "The Tracks of My Tiers," CFA Magazine, (Jul.-Aug. 2010), vol. 21, No. 4: 30-31.

Gastineau, Gary L., and Mark Kritzman, Dictionary of Financial Risk Management, Frank J. Fabozzi Associates, Hoboken, NJ: John Wiley & Sons, 1996 and 1999: 22 and 32.

Gastineau, Gary L. The Exchange-Traded Fund Manual. Hoboken, NJ: John Wiley & Sons, 2002, Second edition, 2010.

Gastineau, Gary L. Someone Will Make Money on Your Funds—Why Not You?: Better Way to Pick Mutual and Exchange-Traded Funds. Hoboken, NJ: John Wiley & Sons, 2005.

Gastineau, Gary L., "The Cost of Trading Transparency: What We Know, What We Don't Know, and How We Will Know," Journal of Portfolio Management, (Fall 2008):72-81.

FA News; ETFs Shunned by Many 401(k) Plans; Aug. 4, 2010 http://www.fa-mag.com/fa-news/5894-etfs-shunned-by-many-401k-plans.html?tmpl=component&print=1 . . . .

Hougan, Matt, "The Flaws in iNAV," Exchange-Traded Funds Report (ETFR), (Jul. 2009): 5-10.

ICE Futures U.S., TIC Trading, (Jan. 2009): v1.3. https://www.theice.com/publicdocs/futures_us/TIC_FAQ.pdf.

IndexUniverse.com—Data Tool—http://www.indexuniverse.com/data/data.html.

Linnainmaa, Juhani T., "Do Limit Orders Alter Inferences about Investor Behavior?," Journal of Finance, (Aug. 2010): 1473-1506.

Melas, Dimitris and Xiaowei Kang, "Applications of Systemic Indexes in the Investment Process," Journal of Indexes, (Sep./Oct. 2010):10-18.

Nasdaq Closing Offset Orders http://www.nasdaqtrader.com/content/ProductsServices/Trading/Crosses/ccfactsheet.pdf.

NYSE Area Closing Trades.

NYSE Rule 2009-111 Refile.

NYSE Rule 2010-14, 75 FR 10538 Mar. 8, 2010.

Prestbo, John, A., The Market's Measure, New York, Dow Jones, 1999, p. 23.

Trade Management Guidelines http://www.cfainstitute.org/ethics/codes/trade/Pages/index.aspx.

Advanced Trading, Sep. 2010. http://i.cmpnet.com/financetech/download/AT_Digital-Issue_2010_09.pdf.

Barney, Lee, "Actively Managed ETFs: Coming Soon to an Exchange Near You?", The Street May 24, 2001, 4 pgs. (http://www.thestreet.com/funds/funds/1440520.html).

Cremers et al., "How Active is Your Fund Manager? A New Measure that Predicts Performance", The Review of Financial Studies, vol. 22, No. 9(2009):3329-3365 http://rfs.oxfordjournals.org/content/22/9/3329.full.pdf.

Gastineau, Gary L., "Protecting Fund Shareholders From Costly Share Trading," Financial Analysts Journal, May/Jun. 2004a, 22-32 (available at http://www.etfconsultants.com/Protecting%/20Fund%20Shareholders%20FAJ.pdf).

Gastineau, Gary L.. "Reinventing the Mutual Fund: An Essential Piece of Financial Engineering" ETF Consultants, Working Paper, Feb. 25, 2005, 32 pgs.

Alexander et al., "Does Motivation Matter When Assessing Trade Performance? An Analysis of Mutual Funds", Working Paper, Feb. 28, 2006, 39 pgs.

Harlow et al., "The Right Answer to the Wrong Question: Identifying Superior Active Portfolio Management" Journal of Investment Management, vol. 4, No. 4, 2006, pp. 1-26.

"Standard & Poor's Depositary Receipts: SPDR Trust, Series 1 Prospectus" American Stock Exchange, http://www.amex.com/etfpros/spdr.PDF, Jan. 26, 2007, 84 pgs.

"Trading Strategies" Turbo Trade.com, http://www.turbotrade.com/content/view/116/94 (last reviewed Jul. 18, 2008).

LeBlanc, Sydney; Article "Do You Know Them?" publishedon Wall Street, Oct. 1, 2004. p. 1.

Federal Register, vol. 75. No. 44, Monday, Mar. 8, 2010, Notices http://edocket.accecc.gpo.gov/2010/pdf/2010-4764.pdf.

Kelly,Susan, "Count ETFs in 401(k)s," Treasury & Risk, Oct. 2009: p. 21, http://beta.treasuryandrisk.com/2009/10/01/count-etfs-in401(k)s.

Wermers et al., "The Investment Value of Mutual Fund Portfolio Disclosure", Working Papers, Oct. 2006, 59 pgs.

Securities and Exchange Commission, Concept Release Actively-Managed Exchange-Traded Funds, 17 CFR Part 270, Release No. IC-25258; File No. S7-20-011 (available at http://www.scc.gov/rules/concept/ic-25258.htm).

Securities and Exchange Commission, Comments on Concept Release Actively-Managed Exchange-Traded Funds, 17 CFR Part 270, Release No. IC-25258; File No. S7-20-011 (available at http://www.sec.gov/rules/concept/s72001.shtml).

Comments of Paul Charbonnet, Investors FastTrack, Baton Rouge, La., Dec. 12, 2002 (available at http://www.sec.gov/rules/concept/s72001/pcharbonnet1.txt).

Comments of Pascal Redding, Jun. 6, 2002 (available at http://www.sec.gov/rules/concept/s72001/predding1.txt).

Comments of John White, May 4, 2002, (available at http://www.sec.gov/rules/concept/s72001/white1.txt).

Comments of R. Sheldon Johnson, Managing Director, Morgan Stanley & Co. Incorporated, May 3, 2002 (available at http://www.sec.gov/rules/concept/s72001/johnson1.htm).

Comments of Charles M. Bartlett Jr., May 2, 2002 (available at http://www.sec.gov/rules/concept/s72001/bartlett.txt).

Comments of Michael J. Ryan, Jr., Executive Vice President and General Counsel, The American Stock Exchange, LLC, Mar. 5, 2002 (available at http://www.sec.gov/rules/concept/s72001/ryan1.htm).

Comments of Stanley Keller, Chair, Committee on Federal Regulation of Securities; Diane E. Ambler, Chair, and Jay G. Baris, Vice-Chair, Subcommittee on Investment Companies and Investment Advisers, Section of Business Law of the American Bar Association, Feb. 1, 2002 (available at http://www.sec.gov/rules/concept/s72001/keller1.htm).

Comments of Robert M. Steele, Executive Vice President, Rydex Global Advisors Inc., Jan. 31, 2002 (available at http://www.sec.gov/rules/concept/s72001/steele1.htm).

Comments of Mike Schoren, Jan. 20, 2002 (available at http://www.sec.gov/rules/concept/s72001/schoren1.txt).

Comments of Gary L. Gastineau, Managing Director, Nuveen Investments, Jan. 14, 2002 (available at http://www.sec.gov/rules/concept/s72001/gastineau1.htm).

Comments of Joel Greenberg, Managing Director, Susquehanna International Group, Jan. 14, 2002 (available at http://www.sec.gov/rules/concept/s72001/greenberg1.htm).

Comments of Austin J. Fleites, Principal, State Street Bank and Trust Company, Jan. 14, 2002 (available at http://www.sec.gov/rules/concept/s72001/fleites1.htm).

Comments of Richard F. Morris, Senior Counsel, Barclays Global Investors, Jan. 11, 2002 (available at http://www.sec.gov/rules/concept/s72001/morris1.htm).

Comments of Ivar Bjornstad, President, Shoreland Partners LLC, Jan. 11, 2002 (available at http://www.sec.gov/rules/concept/s72001/bjornstad1.htm).

Comments of Kriya Inc., Jan. 8, 2002 (available at http://www.sec.gov/rules/concepts72001/goff1.htm).

Comments of Stacy W. Goff, Vice President and Assistant General Counsel, CenturyTel, Inc., Jan. 7, 2002 (available at http://www.sec.qov/rules/concept/s72001/goff.htm).

"ITG ACE—Agency Cost Estimator: A model Description", Investment Technology Group, Inc. Oct. 31, 2007, 70 pgs.

Lee, Charles M.C., "Market Integration and Price Execution for NYSE-Listed Securities", The Journal of Finance, vol. XLVIII, No. 8, Jul. 1993, pp. 1009-2038.

Thirumalai, Ramabhadran S., "Active vs. Passive ETSs", Indiana University, Working Paper, Aug. 27, 2003, 41 pgs.

(56) References Cited

OTHER PUBLICATIONS

"Summary Judgement Ruling in *American Stock Exchange* vs *Mopex, Inc.*"United States District Court, Southern District of New York 00 Civ. 5943 (SAS), Feb. 4, 2003, 23 pgs.

Chapman, Peter; Cover Story; "Converge & Diverge", Trader Magazine, Apr. 2011; (available at http:tradermagazine.com/issues/24_321/ems-nangalia-woodbine-realtick-107422-,,,)_.

Coppejans, Mark and Ananth Madhavean, "The Value of Transaction Cost Forecasts: Another Source of Alpha" Journal of Investment Management, vol. 5 No. 1, (2007): 65-78. http://papers.ssrn.com/sol3/papers.cfm?abstract id-972184.

Chalmers, John M.R., Roger M. Edelen and Gregory B. Kadlec, "On the Perils of Financial Intermediaries Setting Security Prices: The Mutual Fund Wild Card Option," The Journal of Finance, vol. LVI, No. 6, (Dec. 2001a):2209-2236. http://odin.lcb.uoregon.edu/jchalmer/2209-2236.pdf.

Ciccotello, Conrad, S., Roger M. Edelen, Jason T. Greene and Charles W. Hodges, "Trading at Stale Prices with Modern Technology: Policy Options for Mutual Funds in the Internet Age," Virginia Journal of Law and Technology, 6 (2002): 1-31. http://vjolt.net/vol7/issue3/v7i3_a06_Ciccotello.pdf.

Berk, Jonathan B. and Richard C. Green, "Mutual Fund Flows and Performance in Rational Markets," Journal of Political Economy, vol. 112, No. 6, Dec. 2004, 1269-1295 (available at http:www.journals.uchicaqo.edu/JPE/journal/contents/v112n6.html). An earlier version (Dec. 2002) was published as an NBER working paper (available at http://papers.ssrn.com/sol3/papers.cfm?abstract_id=338881).

* cited by examiner

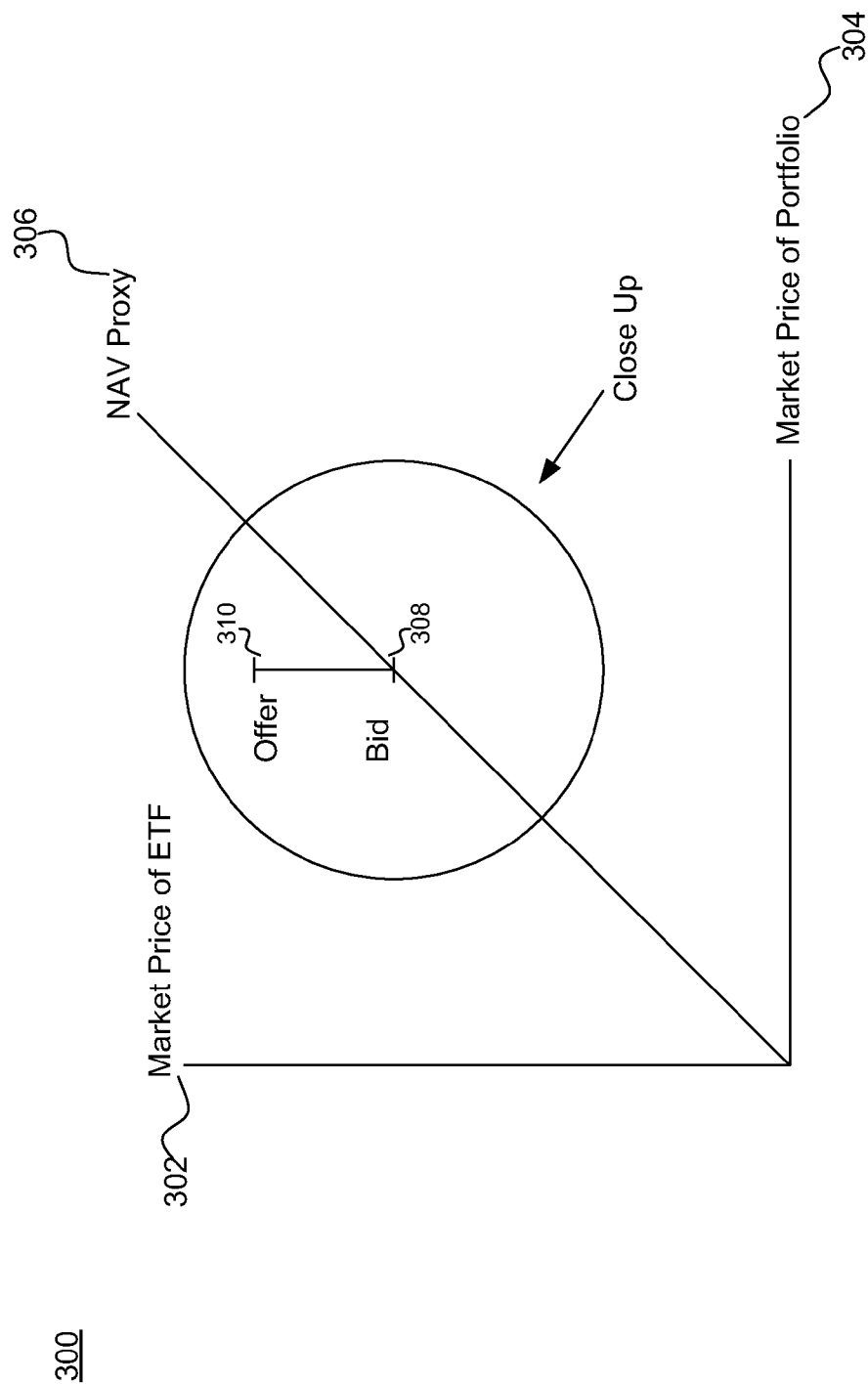

METHODS, SYSTEMS, AND COMPUTER PROGRAM PRODUCTS FOR OBTAINING BEST EXECUTION OF ORDERS TO BUY OR SELL A FINANCIAL INSTRUMENT FOR WHICH A NET ASSET VALUE IS PERIODICALLY CALCULATED

CROSS REFERENCE TO RELATED APPLICATIONS

The present application is a Divisional of U.S. patent application Ser. No. 12/425,044 filed on Apr. 16, 2009, which claims priority to U.S. Provisional Application No. 61/045,683 filed on Apr. 17, 2008 and is a continuation-in-part of pending U.S. patent application Ser. No. 12/056,958, filed on Mar. 27, 2008, and is also a continuation-in-part of pending U.S. patent application Ser. No. 12/056,980, filed on Mar. 27, 2008, both of which are continuations-in-part of U.S. Pat. No. 7,496,531, filed on Mar. 7, 2007, which is a continuation-in-part of U.S. Pat. No. 7,444,300, filed on May 31, 2005, all of which are incorporated herein by reference in their entireties.

BACKGROUND OF THE INVENTION

1. Field of the Invention

The invention relates generally to financial services, and, in particular, to management of order entry and execution in trading financial instruments for which a net asset value is periodically calculated.

2. Background Art

One of the most significant developments in trading of equity and equity-like financial instruments in the United States has been the rapid growth of trading volume in financial instruments for which a net asset value (NAV) is periodically calculated (NAV Instruments). Foremost among these NAV Instruments have been exchange traded funds (ETFs), a type of portfolio investment product first introduced in the U.S. market in 1993 that has enjoyed a high rate of growth in assets and trading volume almost since its introduction.

To illustrate the growth of trading in ETFs, 2006 trading volume was approximately 100 billion ETF shares in the United States. This volume was equal to the trading volume for all equity instruments traded on the New York Stock Exchange just ten years earlier, in 1996. In 2007, ETF volume was about 177 billion shares and, in the first quarter of 2008, average daily ETF volume exceeded one billion shares, suggesting annual ETF trading volume might exceed 250 billion shares for 2008.

As with other classes of securities, the trading volumes for NAV Instruments vary greatly from the least active to the most actively traded securities. Using early 2008 trading data, ETFs that trade more than 1 million shares per day account for about 95% of ETF trading volume. These are predominantly large funds but their trading volume is greatly disproportionate to their assets. To illustrate how disproportionate the volume is in the most actively traded ETFs, ETFs trading a million shares per day or more have assets of about $4.7 billion on average. ETFs trading less than a million shares per day have average assets of about $470 million per fund. While the assets of the most actively traded funds exceed the assets of the typical less actively traded fund by a factor of approximately 10, the average trading volume of funds trading more than a million shares per day is more than 12.5 million shares per day whereas the average trading volume of the less actively traded funds is less than 120,000 shares per day. The trading volume of the more actively traded funds exceeds the trading volume of the less actively traded funds by more than 100 times. The principal reason for the greater trading volume in the most actively traded ETFs is grounded in the history of trading financial instruments based on the indexes used for these actively traded ETFs.

The ETF was designed to provide something to trade on the floor of the Toronto Stock Exchange in Canada and the American Stock Exchange (AMEX) in the United States. History suggested to the AMEX product designers that popular indexes would be the best patterns or templates for actively traded ETF products. By the time the S&P 500 SPDR was introduced in 1993, it was well established that there was considerable interest in S&P 500 portfolio trading and in options and futures contracts on the Standard & Poor's 500. There was also substantial trading volume in other S&P and Russell index derivatives and index portfolio baskets and, eventually, in derivative products based on major Dow Jones, MSCI, Nasdaq and FTSE indexes. The introduction of additional index ETFs since 1993 and the continued emphasis on intraday ETF trading, particularly in competition and conjunction with active trading in futures and option contracts and other instruments based on benchmark indexes has lead to a continuation of the focus of active ETF trading on a relatively small number of ETFs based on popular benchmark indexes.

Today ETFs have moved far beyond the initial objective of trading an index portfolio product that led to their introduction in 1993. The mutual fund market timing and late trading scandals of 2003 and 2004 drew new attention to important characteristics of ETFs that were, in some respects, serendipitous features of their creation a decade earlier. One serendipitous feature was that, in contrast to mutual funds where investors entering and leaving the mutual fund enter and leave at net asset value with the cost of their entry and exit borne by all the shareholders in the fund, ongoing shareholders of most ETFs are protected from the costs of other investors' trading. Apart from ongoing shareholder protection from the costs of fund share trading, there are other advantages of ETFs over conventional mutual funds. Most of these advantages also appeal to long-term investors rather than to short-term traders. Probably the most important of the other ETF advantages is tax efficiency. In most ETFs, an investor need not pay taxes on capital gains until she sells the fund shares. In addition, the conflict of interest between taxable and tax exempt investors that often creates problems for mutual fund portfolio managers is resolved by the ETF structure.

In the context of investment applications, what is needed to further development of the ETF marketplace is a second trading mechanism that meets the needs of investors even if it does not generate as much trading activity as the current trading mechanism.

BRIEF SUMMARY OF THE INVENTION

The supplementary ETF trading mechanism which promises to become the dominant trading mechanism for less actively traded index ETFs and for virtually all actively managed ETFs is a mechanism that provides secondary market NAV-based trading contingent on the closing net asset value of a fund. One of the most important features of having NAV-based secondary market trading alongside conventional intraday trading of ETFs is that the two markets will interact. Market makers who operate in both markets will manage the risk of their positions by trading in the NAV-based market to reduce or increase their position to get to a desired level of exposure to the fund. The present invention consists of methods and related computer systems that use published and proprietary valuation systems and available bids and offers in related markets to provide improved executions in NAV Instruments.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 3A shows the relationship of bids and offers for ETF shares in the conventional ETF market, illustrating a typical relationship of the bid/offer spread to the published intraday NAV proxy.

Figure 1:
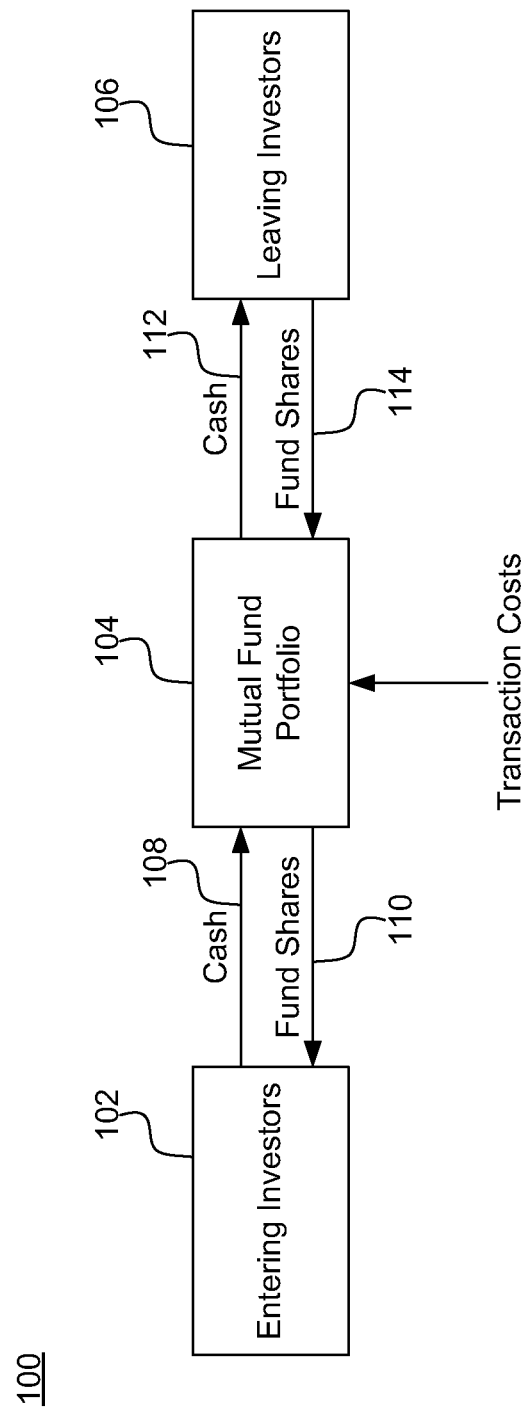
FIG. 1 is a flow diagram that illustrates how assets move into and out of a conventional mutual fund as cash investments and cash redemption payments which are priced at the fund's net asset value on the day the fund investment is made or redeemed.

The features and advantages of the present invention will become more apparent from the detailed description set forth below when taken in conjunction with the drawings.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

An embodiment consists of major and subsidiary components implemented through a variety of separate and related computer systems. These components may be used either individually or in a variety of combinations to achieve the objectives of providing improved executions of NAV Instruments traded contemporaneously in conventional markets and NAV-based markets. The opportunities to integrate the systems covered by the present invention with the methodologies and computer related systems of U.S. Pat. No. 7,496, 531, which is incorporated herein by reference in its entirety, will enable a person skilled in the pertinent art to make and use these inventions together.

I. FEATURES OF EMBODIMENTS OF THE INVENTION

The following features comprise some of the features of one or more embodiments of the invention, and are presented by way of example, and not limitation:

Execute orders in an NAV Instrument on either an NAV-based market or a conventional market using one or more order entry formats to deliver orders to one or more proprietary algorithms that evaluate the importance of, among other things, one or more of (i) the relationships between and among bids, offers, and intraday NAV proxies; (ii) trading volumes, bids, offers and reported transaction prices for NAV Instruments and their underlying constituents; (iii) trading volumes in NAV-based and conventional markets; (iv) recent market volatility and direction; (v) estimates of market depth; and (vi) costs to create or redeem shares or units in an open-end NAV Instrument.

Use price prediction technology to achieve best execution across traditional NAV Instrument markets and NAV-based markets.

Analyze intraday bids and offers in both traditional NAV Instrument markets and NAV-based markets and intraday value information from public and proprietary sources to predict price changes over periods as long as the remainder of the trading session and to manage bids and offers in both markets.

Manage NAV-based contingent orders, executions, and trade reporting to avoid disclosure of information not required by regulators.

Integrate the NAV-based order handling system of patent application Ser. No. 12/056,958 with the order book of an electronic communications network (ECN) that holds undisclosed orders to improve executions in NAV Instruments.

Preference NAV Instrument orders delivered to or by an ECN to improve execution prices of those orders when they reduce imbalances on orders entered from other sources.

Preference orders at or around NAV that offset an imbalance of orders on the other side of the market by compensating providers of imbalance reducing orders for providing liquidity.

II. EXCHANGE TRADED FUNDS

One of the important features of exchange traded funds, the most widely used and actively traded of the NAV Instruments discussed herein, is the difference in the way these funds accommodate transactions with their shareholders compared to the way mutual funds accommodate shareholder transactions. FIG. 1 is a diagram 100 illustrating how transactions occur in the purchase and sale by investors of mutual fund shares. By pricing all transactions in the mutual fund's shares "at the net asset value next determined," the fund 104 provides free liquidity to investors entering 102 and leaving 106 the fund. As FIG. 1 shows, anyone purchasing mutual fund shares for cash 108 gets a share 110 of the securities positions already held by the fund, priced at net asset value. The new investor in a no-load mutual fund typically pays no transaction costs to buy shares. Furthermore, all the non-transacting shareholders of the fund share the transaction costs associated with investing the new investor's cash in portfolio securities. Transaction costs are defined as:

The cost of buying or selling a financial instrument measured in the context of its impact on the portfolio, including, at a minimum, any purchase or sale commission charged by the brokerage firm executing the trade and part of the spread between the bid and the asked prices. More sophisticated transaction cost measurement systems add the market impact of large trades and the opportunity cost of unexecuted trades. The most useful measurements of transaction costs include commissions and fees, market makers' spreads, and opportunity costs associated with not transacting when a trade is not executed. (Dictionary of Financial Risk Management, 1996, p. 285).

Similarly, when an investor departs 106 the mutual fund, that investor receives cash 112 equal to the net asset value of the shares 114 when the NAV is next calculated. All the shareholders in the fund bear the cost of selling portfolio securities to provide this liquidity. To the entering or leaving shareholder, liquidity is essentially free. To the ongoing shareholders of the fund, the liquidity given transacting shareholders is costly. The cost of providing this free liquidity to entering and leaving shareholders is a perennial drag on a mutual fund's performance. Edelen, Roger M., Richard Evans and Gregory B. Kadlec, "Scale Effects in Mutual Fund Performance: The Role of Trading Costs" Unpublished working paper (2007), p. 26 and Table V (An electronic copy of this paper is available at http://ssrn.com/abstract=951367) found that the average cost of providing this liquidity in a large sample of mutual funds was 0.75% of fund assets per year.

Figure 2:
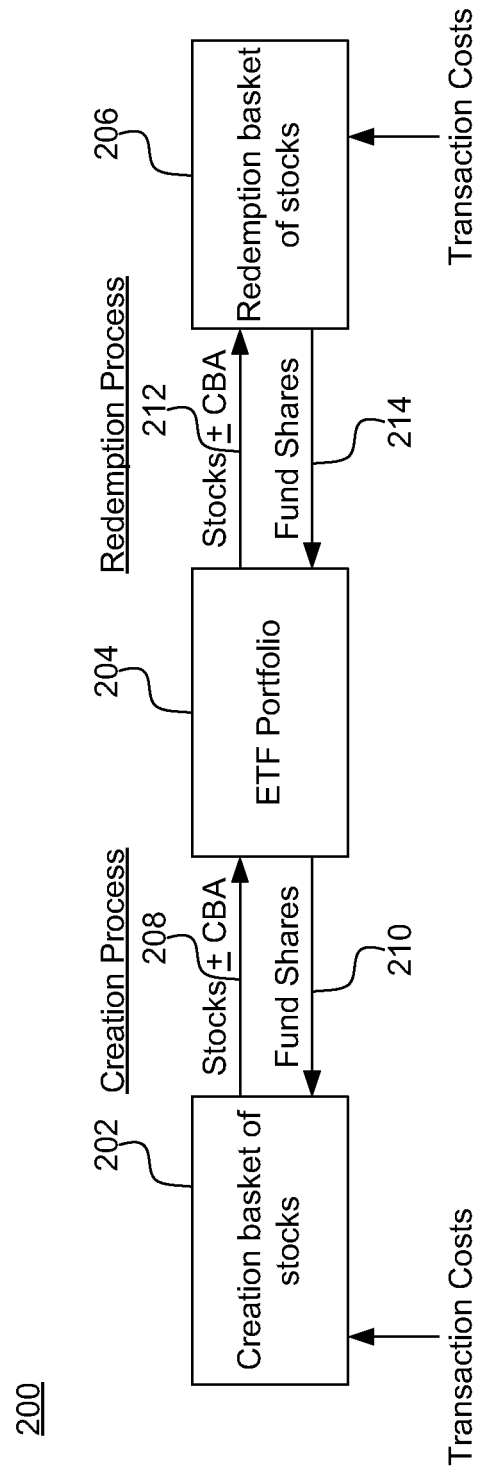
FIG. 2 is a flow diagram that shows how in-kind purchases and redemptions of exchange traded fund (ETF) shares are made at net asset value and how the cost of trading in the securities delivered in a creation or securities received in a redemption are borne by the investors who are moving assets into and out of the fund.

FIG. 2 is a diagram 200 illustrating that exchange-traded funds work differently than mutual funds. For exchange-traded funds, creations and redemptions of ETF shares are typically made in-kind. Baskets of portfolio securities 202 are deposited 208 with the fund 204 in exchange for fund shares 210 in a creation. In a redemption, fund shares are turned in 214 to the fund 204 in exchange 212 for a basket of portfolio securities 206. Small cash balancing amounts (CBA) are used to equalize the values exchanged. The creating or redeeming investor—often, a market maker in the ETF shares—is responsible for the costs of investing in the portfolio securities for deposit and for the costs of disposing of portfolio securities received in the redemption of fund shares. The market maker expects to pass these transaction costs on to investors and traders when he trades fund shares in the secondary market on the exchange. The cost of entering and leaving a fund varies, depending on the level of fund share trading activity and the nature of the securities in the fund's portfolio. For example, on the latter point, the cost of trading in small-cap stocks can be much greater than the cost of trading in large-cap stocks.

ETFs are different from mutual funds in the way they accommodate shareholder entry and exit in at least two ways. As depicted in FIG. 2, the transaction costs associated with ETF shareholder entry and exit are ultimately borne by the entering and exiting investors, not by the fund. Furthermore, unlike a mutual fund, an exchange-traded fund does not have to hold cash balances to provide for cash redemptions. An ETF can stay fully invested at all times. As a result of these differences, the performance experienced by ongoing shareholders in an ETF should, over time, handily surpass the performance experienced by ongoing shareholders of a conventional mutual fund using an identical investment process. Moreover, even though the exchange-traded fund was designed to be traded throughout the trading day on an exchange, the ETF is a much better product than a conventional fund for the shareholder who does not want to trade in and out of the fund, preferring to hold a position in the fund shares indefinitely. As experienced mutual fund market timers know, a mutual fund is a better product to trade than an ETF because the mutual fund pays the timer's trading costs.

The conventional mutual fund structure that provides free liquidity to fund share traders was the breeding ground for the problems of late trading and market timing which provoked the mutual fund scandals of 2003 and 2004. The Securities and Exchange Commission (SEC) has spent a great deal of time and effort trying to deal with the problem of market timing trades in mutual funds without eliminating the free liquidity which ongoing shareholders in mutual funds give entering and leaving shareholders. A variety of operational "patches" have been made by some fund companies as they attempt to restrict market timing trades. In connection with Rule 22c-2, the SEC implemented a complex and costly reporting structure with nearly mandatory redemption fees on mutual fund purchases that are closed out within a week. In the final analysis, the elimination of free liquidity—most easily through the exchange-traded fund in-kind creation and redemption process—is the only way to eliminate market timing without imposing unnecessary costs on all fund investors. Even if there will be no such thing as a market timer in the future, long-term investors will fare better in funds that protect them from the costs of other investors entering and leaving the fund.

To facilitate intraday trading in ETFs, the SEC has required dissemination of intraday calculations of the value of index ETF portfolios. Although intraday index values for the S&P 500 had been available for some time before the introduction of the SPDR (the first U.S. ETF that held an S&P 500 index portfolio), the introduction of ETFs led to the public dissemination of intraday values for the index portfolios underlying ETFs every 15 seconds throughout the trading day.

The ETF market has evolved substantially since the introduction of the first ETFs based on benchmark indexes. Most of the recently introduced index ETFs track less familiar and less popular indexes than the S&P 500, the Dow Industrials, the NASDAQ 100 and the Russell 2000. There are not as many derivatives on or as extensive trading of baskets based on the newer indexes. The absence of intraday trading in other products based on these indexes has made the intraday liquidity of the newer ETFs less reliable than the liquidity in more actively traded ETFs if investors want to make sizable transactions in the intraday market.

As ETF offerings move to special purpose indexes and, more importantly, to actively managed ETFs, there will be less interest in derivatives and in active trading of the ETF shares and more emphasis on the investment merits and basic liquidity of the ETF's shares. When non-transparent actively managed ETFs are introduced, it will not be appropriate to provide intraday valuations every 15 seconds on the portfolios of these funds. Such frequent valuations would compromise the confidentiality of the fund's investment process. Without transparent portfolios, intraday trading will inevitably be less active on these actively managed funds than on most popular index ETFs.

III. NET ASSET VALUE BASED SECONDARY MARKET TRADING FOR EXCHANGE TRADED FUNDS

The objectives and interests of investors and traders who use the more recently issued ETFs, particularly the first limited function actively managed ETFs, will be more oriented toward investment than trading. With less frequent dissemination of intraday values and less scope for intraday arbitrage trading, the motivation that led to the introduction of ETFs as something to trade is switching to the development of something that provides better value to investors than conventional mutual funds because it protects ongoing shareholders from the cost of other investors moving into and out of the fund.

A daily net asset value for both mutual funds and ETFs is typically determined by prices or bids and offers for portfolio holdings prevailing at 4:00 pm in U.S. markets. Not surprisingly, the net-asset-value-based trading mechanism for NAV Instruments is superficially similar to the net-asset-value-based pricing of mutual funds. While the ETFs will not provide free liquidity to entering and departing fund shareholders as the mutual funds do, ETF investors will be able to trade throughout the day at a price that is contingent on the fund's 4:00 pm net asset value calculation. The execution price is from a set of prices that are specified relative to a net asset value calculation. That set of prices will comprise (a) a first price that is at a specified discount to the net asset value; (b) a second price that is equal to the net asset value; and (c) a third price that is at a specified premium to the net asset value. This secondary market NAV-based trading is an efficient trading mechanism that all investors will consider fair. The need for NAV-based secondary market trading for ETFs and other NAV Instruments stems from several facts:

There are differences in the applications traders and investors find for benchmark index ETFs versus custom index and actively managed ETFs where the investment motive dominates the trading requirement.

NAV-based trading will become increasingly important for all ETFs because the nature of the ETF as a portfolio product with portfolio pricing (i.e. pricing of the portfolio, not pricing in the market for the ETF share itself) means that there will inevitably be greater focus on net asset value as ETFs and mutual funds become more interchangeable in investors' minds and portfolios.

Trades executed relative to an ETF's closing net asset value provide the clearest measure for all investors of their fund share trading costs. Trading costs in the intraday ETF market are much more difficult for a typical investor to measure accurately.

This last point is particularly important. The availability of an NAV proxy value every 15 seconds for today's ETFs does not mean that the investor can trade at or relative to that NAV proxy value. Trading in the ETF market now takes place as it does in the stock market—in terms of bids and offers entered in dollars and cents, not relative to a net asset value proxy. Most ETF investors do not see the intraday proxy values disseminated for today's ETFs and many investors are not even aware of the existence of these proxy values. Only in the NAV-based market where the closing net asset value is the basis for trading is any net asset value calculation relevant to the pricing of a specific trade. By trading relative to the closing net asset value every investor can determine, in advance, her cost of trading relative to the closing net asset value of the ETF. It is then a matter of comparing the trading costs of a benchmark index ETF to the trading costs of actively managed ETFs—and to measure executions relative to the net asset value of the fund. Because there will continue to be active intraday trading in many benchmark index ETFs, the spread in NAV-based trading is likely to be tighter in these ETFs than the spread in the NAV-based market in less actively traded ETFs. However, it will be a relatively straightforward process to compare trading costs between and among all ETFs in the NAV-based market.

FIG. 3A is a graph 300 designed to show, by way of a schematic, the pricing relationships that typically prevail in the intraday trading of NAV-based instruments. The relevant prices are the market price of the ETF shown here on the vertical axis 302 and the market price of the portfolio shown here on the horizontal axis 304. Theoretically, the NAV proxy (the 45° line) 306 should be the center point around which intraday trading occurs. As the close up inside the circle illustrates, at any given time the bid 308 and offer 310 from a market maker will typically find either the bid 308 or offer 310 side on or very close to the NAV proxy parity line 306. The other side of the market will be either significantly above or significantly below the parity line 306. This placement of the bid 308 and offer 310 relative to the intraday NAV proxy 306 reflects the fact that most intraday trading in the conventional ETF market is intermediated, that is, a market maker is on one side of the trade. Public orders tend to be predominantly on either the buy side or the sell side at any given moment. Executions very close to net asset value are not common except in the most actively traded ETFs where the bid asked spread may be as small as $0.01 per share. In contrast to the NAV-based market, an investor cannot enter an order for execution relative to the NAV proxy in the traditional market.

Figure 3B:
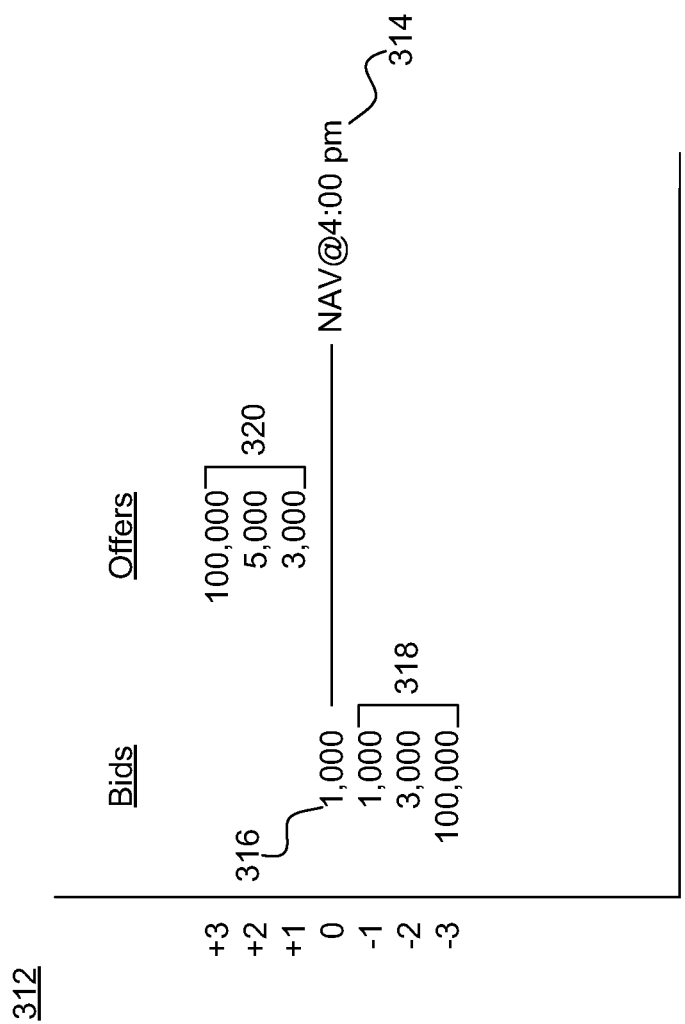
FIG. 3B shows bids and offers in an NAV-based market with a bid/offer schedule centered on the 4:00 pm net asset value which is the basis for bids, offers and executions in this market in pennies ($0.01), in accordance with an embodiment of the present invention.

FIG. 3B is a tabular representation 312 showing a hypothetical schedule of bids and offers in the NAV-based market. In this case there is only one relevant value that serves as the base for trading. That value is the net asset value 314 to be calculated from prices of the NAV Instrument's portfolio as of the end of the trading day. Bids and offers can be entered at or relative to the net asset value. There is a bid for 1,000 shares 316 at net asset value reflected in FIG. 3B. The other bids 318 are below and all the offers 320 are above the yet to be determined 4:00 pm net asset value. The large bids and offerings of 100,000 shares shown 3 cents below and 3 cents above NAV illustrate the availability of large volumes through the ETF share creation/redemption mechanism. In one embodiment of the invention an algorithm will direct orders to the most favorable market, for example, a large sell order will typically be sent to the bid in the intraday market illustrated in FIG. 3A and a buy order to the relatively more favorable offer in the NAV-based market in FIG. 3B. In another embodiment, long latency (resting) orders in the NAV-based market will provide a high degree of liquidity for transactions of significant size. Long latency orders to buy just below and to sell just above a specified NAV calculation entered by market makers and other market participants in furtherance of their trading objectives will provide more liquidity in the NAV based secondary market than is likely to be available in the conventional intraday market, except for the most actively traded benchmark index ETFs.

IV. NEW ORDER FORMATS

The availability of more than one market (one or more each of conventional and NAV-based markets) and more than one meaning that may be attached to such terms as "limit" and "market not held", among others, make it necessary to devise new order formats (order types) and to define commonly used order format terms more precisely to prevent misunderstandings and trading errors. For example, in one implementation of the present invention, an order entered as "market not held" or with some other presently used or newly designated extension or other characterization may grant discretion to the party charged with executing the trade to select the best conventional or best NAV-based market and execute the order in that market (or a combination of markets) immediately, over the course of a trading session or not at all. The choice of market and the format for ultimate order entry on that market may be based on the discretionary judgment of the party handling the order or on an algorithm utilized by that party or a service provider or on other methods apparent to one skilled in the art without departing from the spirit and scope of the present invention.

Another embodiment of the present invention addresses the interaction between the current intraday trading markets in NAV Instruments and markets where NAV Instruments are traded for settlement at or relative to a specified net asset value from the perspective of a market maker. Looking at the market maker's trading objective in both the conventional and in the NAV-based market, the objective in each case might be described as trying to sell ETF shares above a measure of net asset value and buy ETF shares below that measure of net asset value. This same objective applies in both the intraday market and in the NAV-based market, even though the appropriate NAV or NAV proxy in the two markets will be different. Through their common focus on the NAV of the underlying portfolio, the two markets are related and trading in the two markets is integrated.

Figure 4:
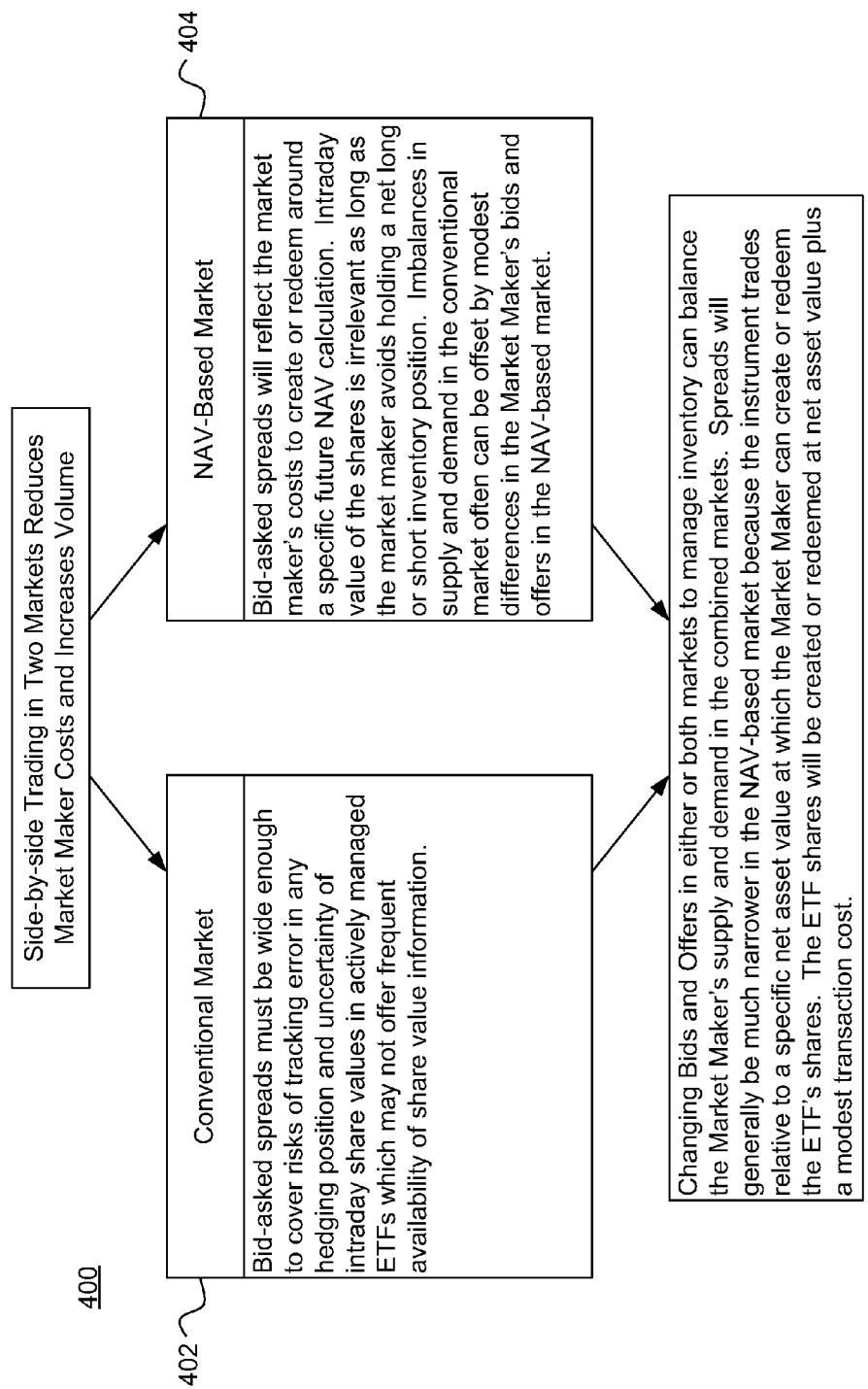
FIG. 4 illustrates some characteristics of market maker risk management using the invention when side-by-side trading in a conventional ETF market and in an NAV-based market are available, in accordance with an embodiment of the present invention. Use of the related markets increases a market maker's flexibility and reduces the costs of position management. As will be seen, availability of the related markets also reduces trading spreads for most investors and increases trading volume in general.

The relationship of the two markets and their joint role in improving the methods market makers will use to manage their positions and reduce their cost of hedging, especially in the trading of actively managed and other NAV-based instruments with non-transparent portfolios, is illustrated in chart 400 of FIG. 4. Portfolio transparency imposes costs on the shareholders of all index funds that shareholders of non-transparent funds can avoid. (See Gastineau, Gary L. "The Cost of Trading Transparency: What We Know, What We Don't Know and How We Will Know," *The Journal of Portfolio Management*, Fall, 2008, pp. 72-81.) Transparency in ETF portfolios reduces the trading cost of ETF shares, but increases the trading costs within ETF portfolios. The present invention facilitates the reduction of costs borne by the ongoing shareholders of a fund, consistent with the ETF principle of imposing the costs of entry into and exit from the fund on entering and exiting investors as illustrated in FIG. 2. FIG. 4 helps illustrate how the interaction of the market maker's bids and offers with its position management can reduce the market maker's costs and risks, facilitating tighter spreads and higher trading volume (greater liquidity) in both a conventional market 402 and an NAV-based market 404. The availability of the two related markets generally means that market maker inventory positions can be smaller than before end-of-day NAV-based trading was introduced. A smaller position generally carries less inventory risk for the market maker. If a market maker is providing seed capital for a newly issued ETF, its inventory might be larger than would be strictly necessary to support a trading book, but the market maker's willingness to make a tight market around the fund's daily NAV should reduce the need for seeding new funds with more than a few million dollars of capital. In this embodiment of the invention, any position a market maker might take, long or short, in intraday trading can be adjusted by trading in the end-of-day NAV-based market.

While the discussion herein emphasizes trading relative to the end of day NAV, it is important to note that other embodiments of the NAV-based market would use an NAV calculation from opening, hourly or other prices, including the end-of-day NAV from a future day. The latter application is discussed below and will be particularly important in NAV instruments based on portfolios consisting of securities and other financial instruments trading in primary markets that have different trading hours than U.S. markets.

One expected consequence of the linkage of the two related markets is that trading spreads will be tighter in both markets then they would have been with the intraday market operating alone. Other probable consequences of this embodiment are that creation and redemption activity will be more frequent, individual creation and redemption transactions will generally be smaller, and creation and redemption activity will have lower market impact. Correspondingly, the total trading volume in the two related ETF share markets will be greater. A universal experience in the history of trading has been that as spreads have narrowed, volumes have increased much more than proportionally. Anyone who doubts this need only compare trading spreads and trading volumes over the past 40 years in any major financial market. Although there have been other contributing factors, the dominant cause of today's high trading volumes is lower trading costs.

The lower trading costs stemming from NAV-based trading should help offset some of the problems attributed to today's electronic markets. The increased trading volumes and tighter bid-asked spreads characteristic of highly automated electronic markets have had a number of effects on the ability of market makers to provide liquidity and on the ability of newly launched ETFs to compete with established benchmark index ETFs. Specifically, traditional exchange floors with Specialists and other market makers charged with making orderly markets in securities are disappearing and being replaced by all-electronic markets. Requirements that orders be routed to the market with the best bid or offer on the other side of the market reduce the margin a market maker can earn in an active market. Correspondingly, the increasing concentration of trading volume in the most actively traded shares leads to wider relative spreads and lower relative trading volume in less actively traded instruments. The Applicants believe that the availability of both traditional intraday trading and NAV-based trading in ETFs will increase the total trading volume—especially in less actively traded ETFs, reduce market maker costs and risks, and increase the ability of exchanges to provide an incentive structure that will encourage the development of new ETFs that offer better value to investors than ETFs that track popular benchmark indexes.

For all NAV Instruments, NAV-based secondary markets are inevitably linked to traditional intraday trading. Investors, brokers and market makers handling or interacting with orders in either of these markets will consider and evaluate a number of variables in different ways when they consider which market to use for a specific order and how to handle that order. For example, the existing intraday evaluation standard for index ETFs is dissemination of an intraday NAV proxy every 15 seconds throughout the trading day. Some NAV Instruments do not and will not offer this specific intraday proxy valuation. For example, subject to SEC exemptive relief, actively managed ETFs with non-transparent portfolios will not publish share valuations at 15 second intervals. Implementations of the invention will direct orders to one market or another and to one of two or more similar products to improve executions based on the available information on fund values and bid-asked spreads.

Apart from differences in the availability of periodic intraday values, there are significant differences of opinion as to appropriate ways to calculate and use intraday ETF net asset value proxies. The principal provider of publicly available NAV proxies is the National Securities Clearing Corporation (NSCC). Most market makers in NAV Instruments arrange for calculation of proprietary NAV proxies which differ in their inputs or outputs in one or more ways from those disseminated by the NSCC. Market makers in ETFs like to develop supplementary information and add nuances aimed at determining the direction and likelihood of any changes in the value of an NAV Instrument. In one embodiment of the invention, brokers and market makers will use proprietary valuation systems in an attempt to improve their handling and pricing of ETF orders and executions. Many fund customers—especially defined contribution accounts and investment advisors experienced in using mutual funds—are accustomed to the type of NAV pricing offered by mutual funds. The NAV-based secondary market in NAV Instruments delivers prices at or relative to the net asset value calculated at the market close that parallel this familiar mutual fund structure. A market maker can manage his position more effectively by operating simultaneously in both conventional intraday and closing NAV-based markets, increasing his profit and trading volume while reducing his risk.

Under one interpretation of Regulation NMS (see http://www.sec.gov/rules/final/34-51808.pdf) a contingent trade (e.g., a trade priced relative to a net asset value calculation that will be made sometime after the execution of the contingent trade) is exempt from the NMS trade-through rules which markets must observe for orders entered for traditional execution. In an embodiment of the present invention, when a broker, market maker, or ECN holds orders exempt from one or more NMS requirements, the undisclosed orders can interact with disclosed and other undisclosed orders in a variety of ways to improve the execution of both orders. In another embodiment, new order types or contingencies may be offered. NAV contingent orders may be executed against displayed and un-displayed orders using low latency order entry techniques and order management algorithms developed by market participants or their service providers. In another embodiment, algorithms will consider the relationships of current disclosed and undisclosed bids and offers in the conventional intraday market and in the NAV-based secondary market and other information developed to improve executions. An example of such other information is a predicted change in an intraday NAV proxy calculated by the NSCC or by another party. In one embodiment, the trading focus may center on predicting the NAV at the end of the day. Newly arriving orders that interact with standing orders in either the traditional market (fully subject to NMS) or in the NAV-based market can be managed by algorithmic models. In another embodiment, a number of order management processes and algorithms can be used to analyze the nature and probe the depth of the liquidity in the two related markets. An ECN specializing in undisclosed NAV-based orders will offer a useful liquidity pool for NAV Instrument transactions.

V. EXECUTING TRADES

The best way to execute a trade may be very different for the most actively traded index ETFs and the less actively traded index or non-transparent (full-featured actively managed) ETFs. Today, Best Execution is defined as, "a trading process Firms apply that seeks to maximize the value of a client portfolio within each client's stated investment objectives and constraints." CFA Institute Trade Management Guidelines, www.cfainstitute.org. Recent volatility of the market—measured in the current trading session and in recent sessions—has important implications for order management. The best way to meet trading and pricing obligations will depend on the presence or absence of various kinds of information from the two markets. For example, limited trading activity and modest order flow will not necessarily lead to high trading risk in the contingent NAV-based market. The focus on a future NAV will make trading costs much easier to control than in the conventional intraday ETF market. If intraday information is limited, as it will be for less transparent ETFs, NAV-based trading will be preferred.

Figure 5:
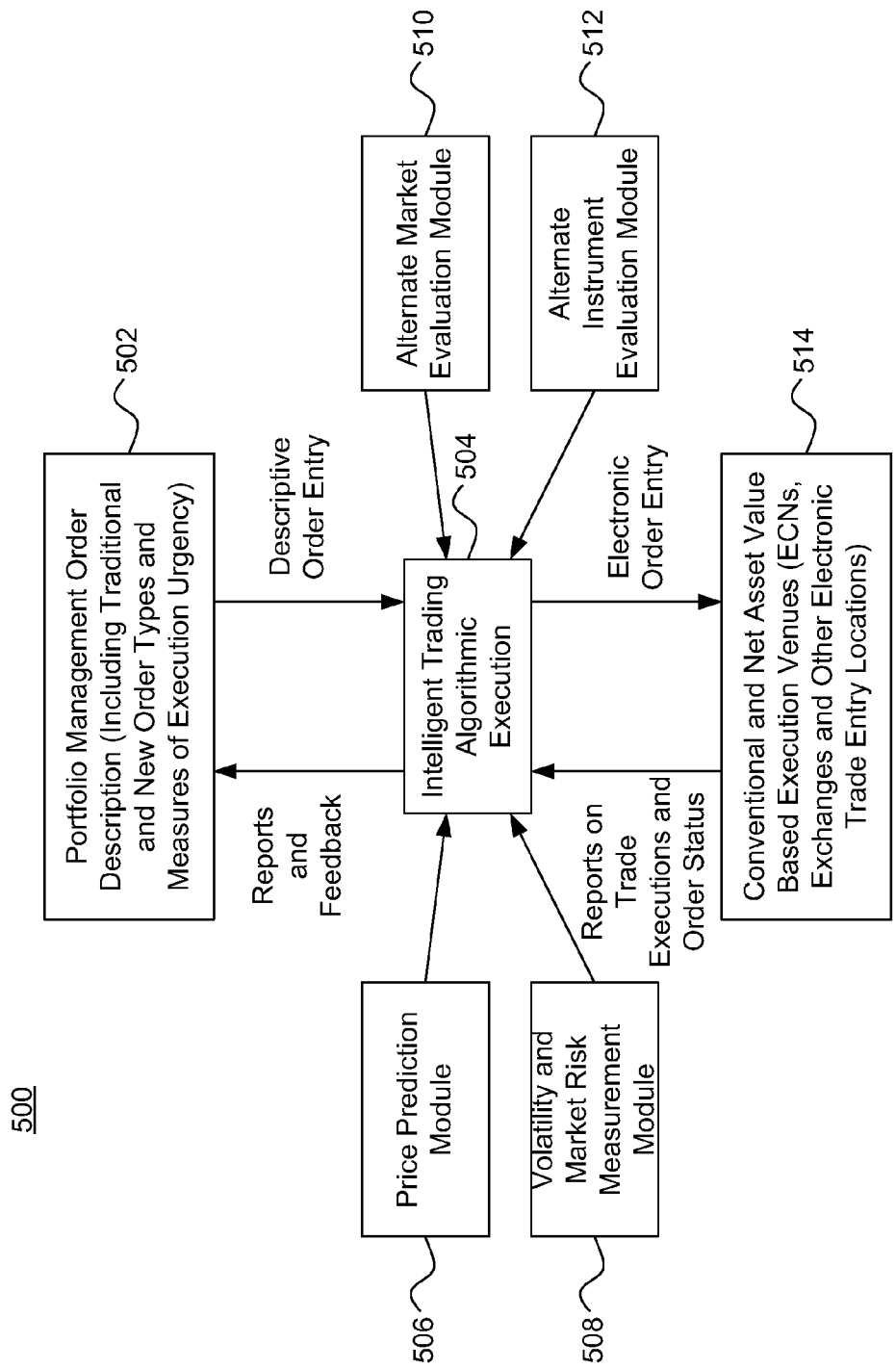
FIG. 5 is a flow diagram that depicts exemplary processes in which a specialized NAV Instrument order management and execution system accepts orders in traditional formats and in new formats from a portfolio management process, assembles data from a variety of markets and market related sources, processes the orders and delivers them for execution with reporting and feedback, in accordance with an embodiment of the present invention.

FIG. 5 is a flow diagram illustrating an automated process for NAV-Instrument order management and execution. While elements or the entire system can be used by a variety of individuals and institutions to implement NAV Instrument trades after evaluation of a wide range of variables that affect optimum order entry and execution over several markets and a number of distinct NAV Instruments, the system 500, as depicted in FIG. 5 is likely to be used by an investment advisor who is responsible for the investment of the assets of individuals or small institutions in NAV Instruments. There is no reason, however, why an individual investor, a major institution or any other investor or investment manager could not use the system. The NAV Instrument order management and execution system 500 consists of a number of processes which perform a variety of functions and which interact to translate the initial portfolio management order description into executable orders in electronic trading venues, using inputs from a variety of specialized analytical modules.

The portfolio management order description 502 might be entered on a form designed to capture the objectives of the entity placing the order—including; for example, measures of the urgency with which the execution is to be pursued or instructions on how to compare conventional market and NAV based market alternatives. A trained portfolio manager might enter the order in standard English sentences and the system would parse the order into specific instructions. Alternatively, a less experienced user of the system might fill out a form online to provide similar information on the way the order is to be executed.

The descriptive order entry is delivered to the intelligent trading algorithmic execution processor 504 for analysis using inputs from a number of sources, four of which are illustrated in FIG. 5. The four trading support modules are a price prediction module 506, a volatility and market risk measurement module 508, an alternative market evaluation module 510, and an alternative instrument evaluation module 512, in accordance with an embodiment of the present invention. These modules reflect some of the tools and features described herein. Their features are summarized here and below. Other modules performing similar or additional useful functions could be added by one skilled in the pertinent art without departing from the spirit and scope of this invention.

The price prediction module 506 comprises a collection of the best available price prediction methods for the markets in which the NAV order management and execution system is operating. The prices predicted may be for indexes, individual securities or even relatively non-transparent fund portfolios based on such variable inputs as factor analysis and past behavior relative to other market measures and portfolios, among others. The price prediction information provided may be expressed in terms of a specific price or in terms of a probability or weighted average forecast with information on reliability and variability around a point estimate.

The volatility and market risk measurement module 508 analyzes and provides input based on analysis of recent and current measurements of volatility and monitors a variety of indicators that are expected to provide useful volatility and risk measurement information to the execution processor 504.

The alternative market evaluation module 510 examines, among other things, the relative attractiveness, for a variety of order types, of the intraday market for an NAV-based Instrument versus the NAV-based market for that NAV Instrument where orders are entered and executed contingent upon the calculation of the end-of-day or some other net asset value for the NAV Instrument. In its market evaluation, the module examines bids, offers, depth and location of bids and offers relative to the intraday NAV proxy and relative to the end-of-day net asset value, looking at features such as those illustrated in FIGS. 3A and 3B and described in the related text.

The alternative instrument evaluation module 512 provides information for situations in which an investor is willing to purchase, sell, or sell short any one of two or more NAV Instruments based on a variety of considerations, including expected transaction costs. To illustrate the use of the alternative instrument evaluation module 512, an investor interested in investing in small cap stocks might be willing to hold an NAV Instrument based on either the Russell 2000 Index or the S&P 600 Index, depending upon their relative attractiveness, the expected trading cost associated with taking either of the two positions and the expected holding period of the position. The alternative instrument evaluation model 512 would look at some of the same information used by the alternative market evaluation model 510 plus differences highlighted by the price prediction model 506 and the volatility and market risk measurement module 508. Once the intelligent trading algorithm execution processor 504 has analyzed and evaluated the data available to it, the system enters electronic orders to execution venues such as ECNs, exchanges and other electronic trade entry locations 514. Reports and trade executions and order status information will be returned to the intelligent trading algorithmic execution process 504 for further evaluation and consideration.

In some instances feedback will be sent to the peripheral modules 506, 508, 510, and 512 for further evaluation. It should be apparent from this description that FIG. 5 illustrates the system and is not intended to limit the scope of the invention. FIG. 5 should not be interpreted as a definitive description of all relevant possibilities.

The Price Prediction Module 506 incorporates models for probabilistic range predictions of prices for financial instruments and portfolios of financial instruments over an interval until a specified net asset value calculation is made. The probabilistic range estimates include estimates of bid-asked spreads in conventional and net asset value based markets.

The Volatility and Market Risk Measurement Module 508 monitors and forecasts volatilities in the form of probability-weighted ranges for prices and bid-asked spreads, including bid-asked spreads affecting the execution of market on close orders. The Volatility and Market Risk Measurement Module 508 indicates the expected cost and value of hedges in intraday or net asset value based markets, reflect a user's preferences for intraday or end of day pricing and provide estimates of the costs of execution immediacy relative to opportunity costs.

Based on revealed user preferences for immediacy and intraday vs. net asset value based executions, the Alternative Market Valuation Module 510 evaluates relative spreads and depths of bids and offers in available markets to determine the contemporary relative attractiveness of available markets to a specific user. An important ongoing calculation relates the location of intraday market bids and offers relative to an NAV proxy and to end of day spreads in the NAV based market. The result of the Alternative Market Valuation Module's 510 evaluation of available markets will be routing an order to one or more conventional markets, routing of the order to one or more NAV-based markets, or direction of the order to two or more eligible markets.

The Alternative Instrument Valuation Module 512 reflects a user's preferences between or among competing instruments or combinations of instruments for which net asset values are periodically calculated and may be used when there are significant differences in efficiency between intraday and net asset value based markets. When such conditions prevail, this module provides information on the relative attractiveness of using one or more other instruments in lieu of the instrument that otherwise best fits the user's investment criteria. The Alternative Instrument Valuation Module 512 evaluates possible choices relative to expected tracking to the best fit choice and to differences in expected transaction and carry costs. This module will be used primarily for evaluation of a best fit instrument relative to other instruments and markets to develop a trading response to competitive valuations and market opportunities.

Figure 6:
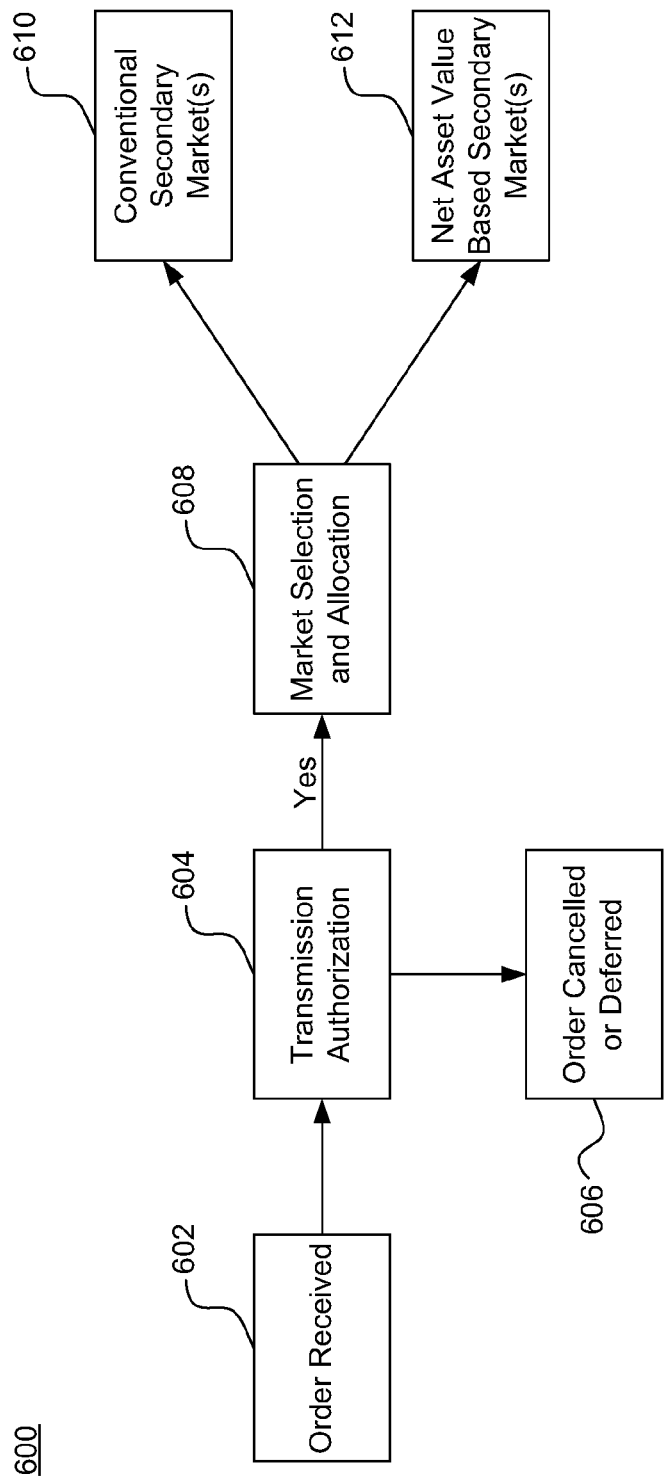
FIG. 6 is a flow diagram that depicts exemplary order management processes by which a financial intermediary such as a broker-dealer, bank or market maker receives, analyses and cancels or transmits for execution an order that could be executed on either a conventional secondary market or a net asset value based market, in accordance with an embodiment of the present invention.

FIG. 6 further illustrates exemplary applications of the system as it might be used by a financial intermediary such as a broker-dealer, a bank or a market maker that deals directly with a customer by whom an order is entered or with an agent of that customer who transmits the customer's order to the intermediary. In contrast to system 500 illustrated in FIG. 5, which stresses the analytical and evaluation process, system 600 shows the order 602 received by the financial intermediary and passed through the transmission authorization process 604 which encompasses modules 502, 504 and elements of other modules shown in FIG. 5 and described above, in accordance with an embodiment of the present invention. In module 604 the order is either cancelled because it cannot be executed under its stated terms 606 or sent for market selection and allocation 608 where it is routed to either conventional secondary market(s) 610 or net asset value based secondary market(s) 612.

Figure 7:
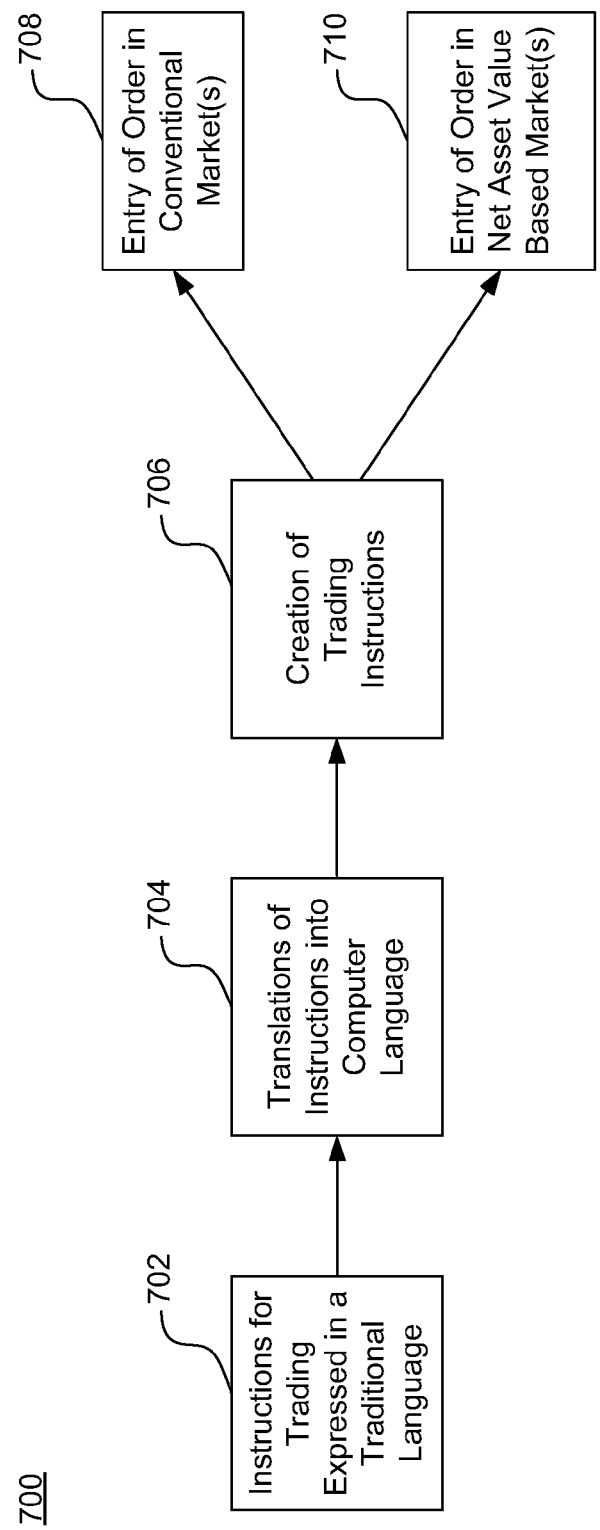
FIG. 7 is a flow diagram that depicts exemplary order management processes by which a specialized computer system receives, translates into computer language and transmits for execution a traditional language expression of trading instructions for an order that could be executed on either a conventional secondary market or a net asset value based market, in accordance with an embodiment of the present invention.

FIG. 7 further illustrates the operation of the system modules 700 that translate an order expressed in a traditional language into instructions expressed in computer language, in accordance with an embodiment of the present invention. The traditional language instructions 702 are translated into computer language by a specialized computer module 704. The resulting computerized instructions are created 706, and the resulting orders are routed to either conventional secondary market(s) 708 or net asset value based secondary market(s) 710.

Figure 8:
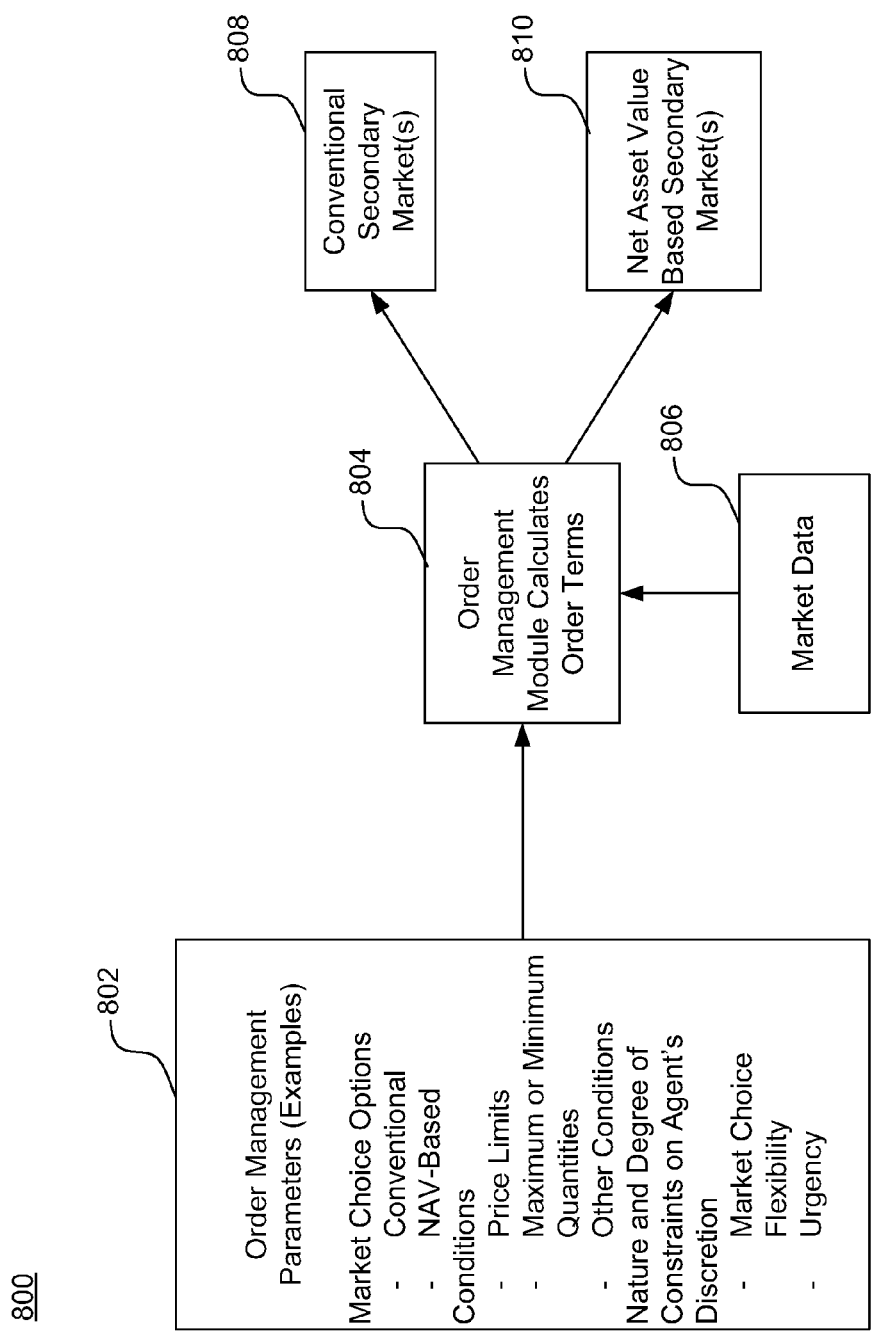
FIG. 8 is a flow diagram that depicts exemplary order management processes by which a specialized computer system receives, calculates order terms, formats and transmits for execution an order that could be executed on either a conventional secondary market or a net asset value based market, in accordance with an embodiment of the present invention.

FIG. 8 further illustrates exemplary applications of the system, emphasizing some of the order management parameters evaluated as part of operation of the modules described more fully in connection with the discussion of FIG. 5, in accordance with an embodiment of the present invention. In contrast to system 500 illustrated in FIG. 5, which stresses the analytical and evaluation process, system 800 emphasizes some examples of the order management parameters 802 that are received or evaluated in the order transmission authorization process 604 and described above. In order management calculation module 804 the order management parameters are evaluated in the context of available market data 806 before routing to either conventional secondary market(s) 808 or net asset value based secondary market(s) 810.

Figure 9:
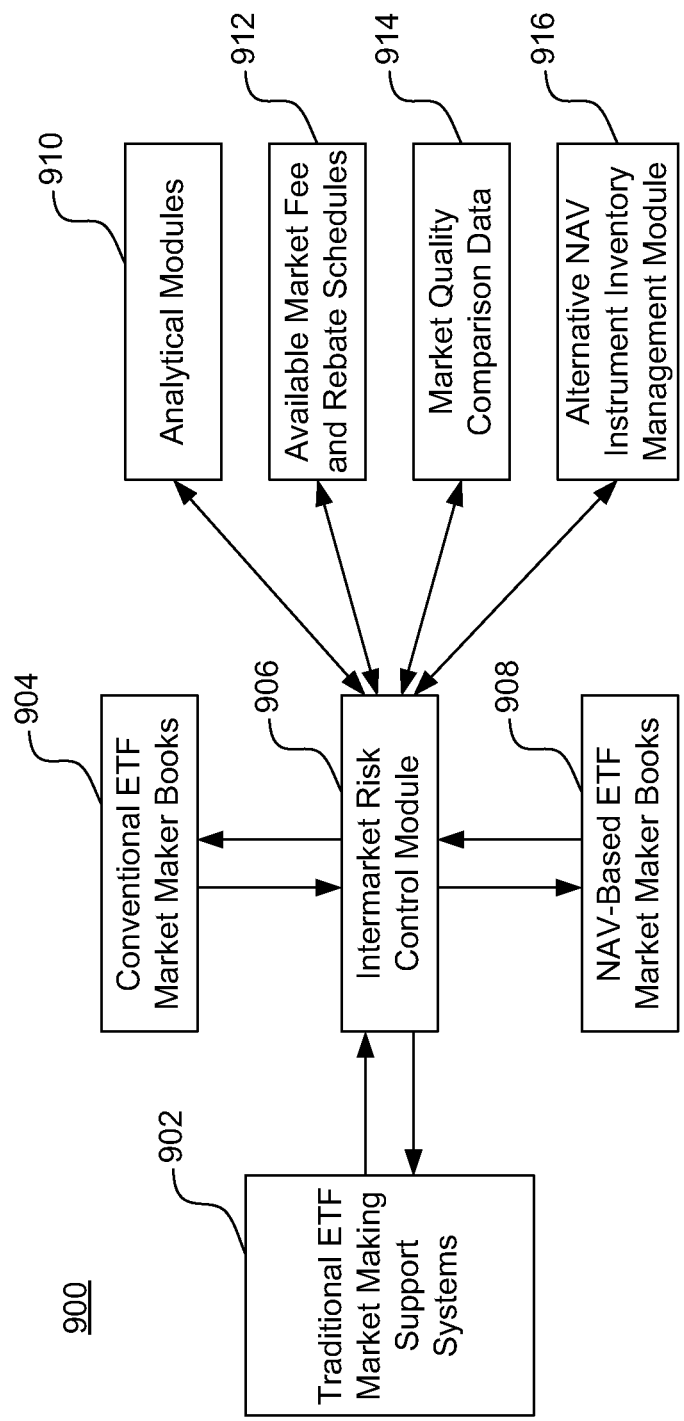
FIG. 9 is a flow diagram that depicts exemplary risk and order book management systems of a market maker that maintains markets in conventional secondary markets or net asset value based markets in instruments for which a net asset value is periodically calculated, in accordance with an embodiment of the present invention.

FIG. 9 emphasizes exemplary applications of the system from the perspective of its use by a market maker trading instruments for which a net asset value is periodically calculated, in accordance with an embodiment of the present invention. As represented in FIG. 9, system 900 illustrates the interaction of an embodiment of the present invention with existing market maker operations, with particular emphasis on traditional ETF market making support systems 902 and conventional ETF market maker books 904. It is clear to one skilled in the relevant arts, from the present specification and from the patent specifications from which it is a continuation, that the ETF market maker's role and the operation of an ETF market-making book are different in a number of ways from market making in, for example, a common stock. Exemplary differences in market making stem from the facts that (1) an ETF is a derivative instrument that gets its underlying value from a portfolio that is priced in a market that usually operates contemporaneously with the market in which the ETF shares are traded and (2) the market maker's inventory can be adjusted not only by trading the ETF shares but by creating and redeeming ETF shares.

With the introduction of a new market where the ETF is traded at or relative to its net asset value, additional changes in the market maker's risk management process are necessary. These changes are represented in the intermarket risk control module 906 that incorporates many of the invention's features used by market makers and described in detail in the discussion of FIG. 5. The intermarket risk control module 906 interacts with the analytical modules 910 described in more detail in the discussion of modules 506, 508, 510, and 512 in connection with FIG. 5 above. Another module analyzes available market fee and rebate schedules 912. These schedules may affect where and when a market maker chooses to enter a bid or offer because small per lot fee and rebate differences can be an important profit determinant in a high volume market making operation. The market quality comparison module 914 analyses market data from the market maker's perspective to aid in the selection of trading venues that attract orders and order patterns that offer profit opportunities that the market maker can take. The alternative NAV instrument inventory management module 916 is linked to the alternate instrument evaluation module 512 and controls the selection and management of correlated instrument positions that can offer attractive risk management alternatives that a market maker can use more effectively than most other market participants.

As implied by prior references to multiple NAV-based markets, some special situations that arise from net asset value based trading will affect order handling choices. For example, NAV based trading in a specific financial instrument for which a net asset value is calculated will often be available simultaneously relative to two different net asset value calculations. In conventional markets for financial instruments, buy and sell orders interact only with other orders to buy and sell the same instrument under standard (identical) terms for pricing and settlement. In an embodiment of the present invention, there may be trading in a financial instrument for which a net asset value is calculated in a conventional market and trading in the same instrument at or relative to two or more contingent net asset value calculations at the same time. To illustrate, with respect to transactions involving shares of exchange traded funds holding securities traded principally in markets that operate outside U.S. trading hours, one function of a net asset value based market will be to reduce the risk of trading with a counterparty that has better information than you have. One way to reduce counterparty knowledge risk is to trade at or relative to a net asset value to be calculated after the securities in the portfolio have traded for a full trading session in their principal market. In the event that currency, commodity or conflict news has an outsized impact on the value of a country's securities during hours that the country's home markets are not open for trading, a sensible approach for many investors who lack special skills or comprehensive knowledge of these markets will be to accept the result of the price discovery mechanism in the home market and trade the exchange traded fund's shares relative to the next day's net asset value—after the primary market has traded the shares for a day.

Another case when a later day's net asset value might be a better choice is after full function actively managed exchange traded funds are introduced. These funds will have an earlier cut off time for creation and redemption transactions than the 4:00 p.m. close—the time when the prices used for the current day's net asset value calculation will be determined. A creation or redemption order entered after the cut off time might be priced at the following day's net asset value. After the daily creation/redemption cut off time, market makers are likely to widen the spread between their bids and offers in the net asset value based market for the current day. The spread for NAV based trades around the following day's net asset value should still be very tight. Investors and market makers using these markets will approach trading in these markets differently after the creation/redemption cut off time.

The ability to trade fund shares at or relative to one net asset value, let alone two or more net asset value calculations has not been encountered in secondary financial markets to date. A variety of responses to the range of choices might be deemed appropriate by different market participants under different circumstances. Possible decision rules include:

Trade in the net asset value based market with the shortest time remaining before the contingent net asset value based calculation will be made;

Trade in the net asset value based market with the longest time remaining before the contingent net asset value based calculation will be made;

Trade in the net asset value based market with the tightest bid-ask spread; and

Use an algorithm that incorporates or evaluates information about the causes of differences in probable price levels and posted spreads in two or more net asset value based markets to choose the appropriate net asset value calculation as the basis for a trans action.

The last two choices are preferred embodiments of the present invention.

Similar instruments for which net asset values are periodically calculated are acceptable alternatives for some investors. An example of this situation might be two or more exchange traded funds tracking the same or very similar indexes. In an embodiment of the present invention, investors and market makers may trade in any of a number of exchange traded funds (or other exchange traded NAV Instruments) tracking the same or very similar indexes or portfolios with the traders' bids and offers for each instrument dependent on the expense ratio of an exchange traded fund (or exchange traded note), the size and sign (positive or negative) of the tracking error of the fund relative to the index, the relative performance of two different indexes, the bid-asked spreads in the conventional and net asset value markets for similar instruments and other features of the respective instruments and the markets for each instrument. Some approaches to this situation are suggested in the discussion of the alternative instrument valuation module above.

Use of dark pools, cloaked orders and replenishing limit orders will grow when one or more net asset value markets are available. Some securities markets permit and even facilitate fully or partially cloaked (hidden) orders, including orders held in so-called "dark pools" with various restrictions on access to information about these orders. In embodiments of the present invention, when a transaction occurs or when a low latency limit order is detected, an adjustment may be made in the size or price of a bid or offer in a dark pool or an execution against a limit order may result in replenishment of the shares traded or some other change in the terms of the order. While the presence of orders for execution in multiple markets complicates trading relative to conventional trading in a single market for a financial instrument, the methods used to accommodate and manage a greater range of related orders need not be conspicuously different from the management of such orders in the conventional market(s) for financial instruments already operating today. In contrast to the need for new methods to manage multiple net asset value based markets and choices between and among similar net asset value instruments, managing uncommon order types in dark pools or elsewhere is usually not different from what investors encounter in conventional markets today.

VI. EXEMPLARY COMPUTER SYSTEMS

Figure 10:
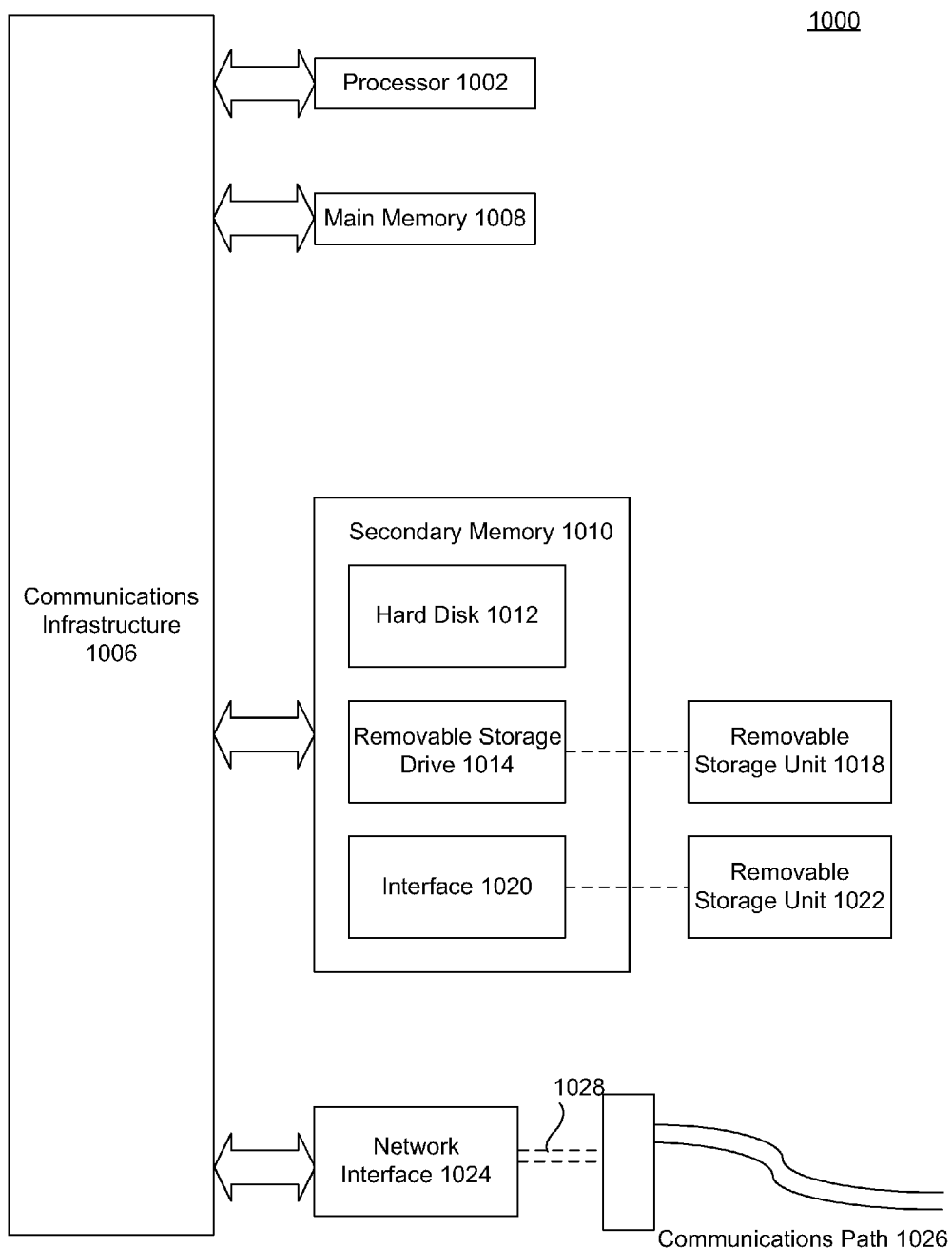
FIG. 10 is a block diagram of an exemplary computer connected to a network upon which the exemplary methods and systems of the present invention may be implemented.

FIG. 10 is a diagram of an exemplary computer system 1000 upon which embodiments of the present invention (or components thereof) may be implemented. The exemplary computer system 1000 includes one or more processors, such as processor 1002. The processor 1002 is connected to a communication infrastructure 1006, such as a bus or network. Various software implementations are described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may include a secondary memory 1010. The secondary memory 1010 may include, for example, a hard disk drive 1012 and/or a removable storage drive 1014, representing a magnetic tape drive, an optical disk drive, etc. The removable storage drive 1014 reads from and/or writes to a removable storage unit 1018 in a well-known manner. Removable storage unit 1018 represents a magnetic tape, optical disk, or other storage medium that is read by and written to by removable storage drive 1014. As will be appreciated, the removable storage unit 1018 can include a computer usable storage medium having stored therein computer software and/or data.

In alternative implementations, secondary memory 1010 may include other means for allowing computer programs or other instructions to be loaded into computer system 1000. Such means may include, for example, a removable storage unit 1022 and an interface 1020. An example of such means may include a removable memory chip (such as an EPROM, or PROM) and associated socket, or other removable storage units 1022 and interfaces 1020, such as a memory stick or memory card, which allow software and data to be transferred from the removable storage unit 1022 to computer system 1000.

Computer system 1000 may also include one or more communications interfaces, such as communications interface 1024. Communications interface 1024 allows software and data to be transferred between computer system 1000 and external devices. Examples of communications interface 1024 may include a modem, a network interface (such as an Ethernet card), a communications port, a WIFI interface, a Bluetooth interface, a cellular interface, a PCMCIA slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, a wireless link and other communications channels. In an embodiment of the invention, signals 1028 comprise carrier waves modulated with control logic.

Any apparatus or manufacture comprising a computer useable or readable medium having control logic (software) stored therein is referred to herein as a computer program product or program storage device. This includes, but is not limited to, the computer 1000, the main memory 1008, the hard disk 1012, the removable storage units 1018, 1022 and the carrier waves modulated with control logic 1028. Such computer program products, having control logic stored therein that, when executed by one or more data processing devices, cause such data processing devices to operate as described herein, represent embodiments of the invention.

IV. CONCLUSION

Embodiments of the present invention are directed to the introduction of methods, systems, and computer-program products to provide risk information, cost estimation and decision-making tools to traders in exchange-traded fund shares.

According to various embodiments of the disclosed processes, supplemental information is developed, calculated, and published to support a choice of trading platforms and methods for exchange-traded funds, especially funds that are not actively traded or have portfolios that are not totally transparent. The trading process preserves fund portfolio confidentiality while permitting market makers and other traders in these non-transparent exchange-traded funds to estimate trading costs and risks and manage ETF trading more effectively.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

What is claimed is:

1. A method of order management and execution for trading an exchange listed financial instrument for which a net asset value is periodically calculated, comprising:
    (a) receiving, with an order receipt computer, an order to trade an exchange listed financial instrument for which a net asset value is periodically calculated, said order authorizing at least one of a specified party and a computerized algorithm to transmit the order for execution;
    (b) determining, with a market and order evaluation computer, whether to authorize the transmission of the order for execution in whole, in part, or not at all;
    (c) selecting, with a market selection computer, at least one market from a plurality of net asset value based secondary markets that offer contemporaneous trading at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value; where said net asset value is calculated from at least one of bids, offers, and prices of underlying financial instruments at times;
    (d) selecting, with an order type selection computer, at least one order type from the order types authorized by said order and offered by a selected market;
    (e) authorizing, with an order entry computer, at least one of entry of all of the order, entry of part of the order, and cancellation of all or part of the order; and
    (f) generating, with an instruction computer one or more of authorized orders, order portions, or cancellations, for selected markets, wherein the generated authorized orders are used for subsequent trading on the selected market.

2. The method of claim 1, wherein said selecting (c) further comprises optionally selecting said at least one market from among one or more conventional secondary markets.

3. The method of claim 1, wherein said receiving (a) further comprises receiving, with the order receipt computer, the order in the form of an order to buy or sell at least one of whole and fractional units of at least one of:
    a specified exchange listed financial instrument for which a net asset value is periodically calculated,
    a combination of specified exchange listed financial instruments for which a net asset value is periodically calculated, and
    a combination of a specified exchange listed financial instrument for which a net asset value is periodically calculated and other financial instruments.

4. The method of claim 1 further comprising, with an instruction computer module, at least one of:
    receiving or delivering instructions for trading said financial instrument wherein the instructions are stated in one or more spoken or written languages or simplified elements from such languages;
    translating trading instructions into computer executable orders; and entering said computer executable orders into said at least one selected market for execution.

5. The method of claim 1 further comprising:
    formatting said order, with a formatting computer, to include at least one of:
    a description of how the order should be routed to at least one selected market; a description of any price limits or other conditions or contingencies imposed on execution; and
    a provision giving an agent managing the order discretion to at least one of (i) route the order to one or more selected markets using available or subsequently obtained or developed information and (ii) cancel the order.

6. The method of claim 1, wherein said selecting (c) and (d) further comprise:
    selecting at least one market and one order type used in that market by optimizing for at least one factor or criterion from a set of factors or criteria comprising at least one of:
    reducing at least one of expected transaction costs, including any net market fees; and the variability of transaction costs;
    concentrating orders to capture rebates, comprising at least one of rebates of exchange fees and rebates of market data revenue;
    making cross market comparisons of relationships between and among variables comprising bids, offers, fee and rebate structures, net asset values and net asset value proxy calculations, trading volumes and bid and offer sizes;
    consulting a database of at least one of volatility and trading cost experiences in available markets with available order types; and
    finding greater liquidity by trading in multiple markets.

7. The method of claim 1, further comprising: using one or more analytical computers to process information accumulated and organized to provide at least one of:
    absolute or relative price predictions for financial instruments;
    measurement or prediction of price volatility;
    selection of markets for trade execution; and
    comparative evaluation and selection from among two or more financial instruments with correlated return behavior.

8. The method of claim 1 further comprising at least one of:
    developing bids and offers in said instrument, in one or more conventional markets and in one or more net asset value based markets, such markets operating contemporaneously;
    selectively executing trades in said instrument, in one or more of said conventional and said net asset value markets; and
    at least one of (i) paying or receiving a financial incentive for one or more varieties of executed resting orders and (ii) paying or receiving fees or other costs to execute a trade against resting orders.

9. The method of claim 1, wherein said selecting (c) and (d) further comprise comparing bids and offers contemporaneously available in multiple markets and using different order types.

10. The method of claim 9, further comprising:
transmitting the order to one or more selected markets to obtain best execution based on an evaluation of at least one of:
bid price;
bid size;
offer price;
offer size;
relationships among bids, offers, net asset value proxies and net asset values available, calculated or to be calculated from at least one of bids, offers and recently executed trades in portfolio components or benchmarks for said exchange-listed financial instrument; and structural features of the markets.

11. The method of claim 1, further comprising:
transmitting the order to one or more selected markets to obtain best execution measured by an expected or specified difference between a projected execution price and at least one of:
a net asset value proxy;
a net asset value to be calculated by, or on behalf of, an issuer of the financial instrument;
another net asset value calculation appropriate for such comparisons in at least one of the markets; and another price or value calculation.

12. The method of claim 1, further comprising:
hedging systematic or beta risks and risks of timing differences between conventional and net asset value based executions using correlated instruments.

13. An order management and execution system for trading an exchange listed financial instrument for which a net asset value is periodically calculated, comprising:
an order receipt computer configured to receive an order to trade an exchange listed financial instrument for which a net asset value is periodically calculated, said order authorizing at least one of a specified party and a computerized algorithm to transmit the order for execution;
a market and order evaluation computer configured to determine whether to authorize the transmission of the order for execution for execution in whole, in part, or not at all;
a market selection computer configured to select at least one market from a plurality of net asset value based secondary markets that offer contemporaneous trading at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value; where said net asset value is calculated from at least one of bids, offers, and prices of underlying financial instruments at times;
an order type selection computer configured to select at least one order type from the order types authorized by said order and offered by a selected market;
an order entry computer configured to authorize at least one of entry of all of the order, entry of part of the order, and cancellation of all or part of the order; and
an instruction computer configured to generate one or more of authorized orders, order portions, or cancellations, for selected markets, wherein the generated authorized orders are used for subsequent trading on the selected market.

14. The system of claim 13, wherein said market selection computer is further configured to optionally select said at least one market from among one or more conventional secondary markets.

15. The system of claim 13, wherein said order receipt computer is further configured to receive the order in the form of an order to buy or sell at least one of whole and fractional units of at least one of:
a specified exchange listed financial instrument for which a net asset value is periodically calculated;
a combination of specified exchange listed financial instruments for which a net asset value is periodically calculated; and
a combination of a specified exchange listed financial instrument for which a net asset value is periodically calculated and other financial instruments.

16. The system of claim 13 further comprising an instruction computer configured to at least one of:
receive or deliver instructions for trading said financial instrument wherein the instructions are stated in one or more spoken or written languages or simplified elements from such languages;
translate trading instructions into computer executable orders; and
enter said computer executable orders into at least one selected market for execution.

17. The system of claim 13 further comprising a formatting computer configured to format said order to include at least one of:
a description of how the order should be routed to at least one selected market;
a description of any price limits or other conditions or contingencies imposed on execution; and
a provision giving an agent managing the order discretion to at least one of (i) route the order to one or more selected markets using available or subsequently obtained or developed information and (ii) cancel the order.

18. The system of claim 13, wherein said market selection and said order type selection computer are configured to:
select at least one market and one order type used in that market by optimizing for at least one factor or criterion from a set of factors or criteria comprising at least one of:
reducing at least one of expected transaction costs, including any net market fees, and the variability of transaction costs;
concentrating orders to capture rebates, comprising at least one of rebates of exchange fees and rebates of market data revenue;
making cross market comparisons of relationships between and among variables comprising bids, offers, fee and rebate structures, net asset values and net asset value proxy calculations, trading volumes and bid and offer sizes;
consulting a database of at least one of volatility and trading cost experiences in available markets with available order types; and
finding greater liquidity by trading in multiple markets.

19. The system of claim 13, further comprising one or more analytical computer configured to process information accumulated and organized to provide at least one of:
absolute or relative price predictions for financial instruments;
measurement or prediction of price volatility;
selection of markets for trade execution; and comparative evaluation and selection from among two or more financial instruments with correlated return behavior.

20. The system of claim 13 being further configured to at least one of:
develop bids and offers in said instrument, in one or more conventional markets and in one or more net asset value based markets, such markets operating contemporaneously;
selectively execute trades in said instrument, in one or more of said conventional and said net asset value markets; and
at least one of (i) pay or receive a financial incentive for one or more varieties of executed resting orders and (ii) pay or receive fees or other costs to execute a trade against resting orders.

21. The system of claim 13, further comprising a net asset value based market computer configured to generate a net asset value based secondary market platform configured to enable contemporaneous trading at, or relative to, at least two different net asset value calculations, where each of said calculations is made from at least one of bids, offers, and prices of underlying financial instruments measured at different specified times.

22. The system of claim 13, wherein said market selection and order type computers are configured to compare bids and offers contemporaneously available in multiple markets and using different order types.

23. The system of claim 22, being further configured to:
transmit the order to one or more selected markets to obtain best execution based on an evaluation of at least one of:
bid price;
bid size;
offer price;
offer size;
relationships among bids, offers, net asset value proxies and net asset values available, calculated or to be calculated from at least one of bids, offers and recently executed trades in portfolio components or benchmarks for said exchange-listed financial instrument; and
structural features of the markets.

24. The system of claim 13, being further configured to:
transmit the order to one or more selected markets to obtain best execution measured by an expected or specified difference between a projected execution price and at least one of: a net asset value proxy;
a net asset value to be calculated by, or on behalf of, an issuer of the financial instrument;
another net asset value calculation appropriate for such comparisons in at least one of the markets; and
another price or value calculation.

25. The system of claim 13, being further configured to:
hedge systematic or beta risks and risks of timing differences between conventional and net asset value based executions using correlated instruments.

26. An article of manufacture for order management and execution of trading in an exchange listed financial instrument for which a net asset value is periodically calculated, said article of manufacture comprising a non-transitory computer usable medium having a computer readable program code embodied therein, for:
(a) receiving, with an order receipt computer, an order to trade an exchange listed financial instrument for which a net asset value is periodically calculated, said order authorizing at least one of a specified party and a computerized algorithm to transmit the order for execution;
(b) determining, with a market and order evaluation computer, whether to authorize the transmission of the order for execution in whole, in part, or not at all;
(c) selecting, with a market selection computer, at least one market from a plurality of net asset value based secondary markets that offer contemporaneous trading at prices determined from a set of prices that are specified relative to the net asset value, said set of prices including (i) a first price that is at a specified discount to the net asset value; (ii) a second price that is equal to the net asset value; and (iii) a third price that is at a specified premium to the net asset value; where said net asset value is calculated from at least one of bids, offers, and prices of underlying financial instruments at times;
(d) selecting, with an order type selection computer, at least one order type from the order types authorized by said order and offered by a selected market;
(e) authorizing, with an order entry computer, at least one of entry of all of the order, entry of part of the order, and cancellation of all or part of the order; and
(f) generating, with an instruction computer one or more of authorized orders, order portions, or cancellations, for selected markets, wherein the generated authorized orders are used for subsequent trading on the selected market.

27. The article of manufacture of claim 26, wherein said computer readable program code for selecting (c) further comprises computer readable program code for optionally selecting said at least one market from among one or more conventional secondary markets.

28. The article of manufacture of claim 26, wherein said computer readable program code for receiving (a) further comprises computer readable program code for receiving the order in the form of an order to buy or sell at least one of whole and fractional units of at least one of:
a specified exchange listed financial instrument for which a net asset value is periodically calculated;
a combination of specified exchange listed financial instruments for which a net asset value is periodically calculated; and
a combination of a specified exchange listed financial instrument for which a net asset value is periodically calculated and other financial instruments.

29. The article of manufacture of claim 26 further comprising computer readable program code for at least one of:
receiving or delivering instructions for trading said financial instrument wherein the instructions are stated in one or more spoken or written languages or simplified elements from such languages;
translating trading instructions into computer executable orders; and
entering said computer executable orders into said at least one selected market for execution.

30. The article of manufacture of claim 26 further comprising computer readable program code for:
formatting said order to include at least one of:
a description of how the order should be routed to at least one selected market;
a description of any price limits or other conditions or contingencies imposed on and
a provision giving an agent managing the order discretion to at least one of (i) route the order to one or more selected markets using available or subsequently obtained or developed information and (ii) cancel the order.

31. The article of manufacture of claim 26, wherein said computer readable program code for selecting (c) and (d) further comprises computer readable program code for:
- selecting at least one market and one order type used in that market by optimizing for at least one factor or criterion from a set of factors or criteria comprising at least one of:
- reducing at least one of expected transaction costs, including any net market fees, and the variability of transaction costs;
- concentrating orders to capture rebates, comprising at least one of rebates of exchange fees and rebates of market data revenue;
- making cross market comparisons of relationships between and among variables comprising bids, offers, fee and rebate structures, net asset values and net asset value proxy calculations, trading volumes and bid and offer sizes;
- consulting a database of at least one of volatility and trading cost experiences in available markets with available order types; and
- finding greater liquidity by trading in multiple markets.

32. The article of manufacture of claim 26, further comprising computer readable program code for:
- processing information accumulated and organized to provide at least one of: absolute or relative price predictions for financial instruments;
- measurement or prediction of price volatility;
- selection of markets for trade execution; and
- comparative evaluation and selection from among two or more financial instruments with correlated return behavior.

33. The article of manufacture of claim 26 further comprising computer readable program code for at least one of:
- developing bids and offers in said instrument, in one or more conventional markets and in one or more net asset value based markets, such markets operating contemporaneously;
- selectively executing trades in said instrument, in one or more of said conventional and said net asset value markets; and
- at least one of (i) paying or receiving a financial incentive for one or more varieties of executed resting orders and (ii) paying or receiving fees or other costs to execute a trade against resting orders.

34. The article of manufacture of claim 26, wherein said computer readable program code for selecting (c) and (d) further comprises computer readable program code for comparing bids and offers contemporaneously available in multiple markets and using different order types.

35. The article of manufacture of claim 34, further comprising computer readable program code for:
- transmitting the order to one or more selected markets to obtain best execution based on an evaluation of at least one of:
- bid price;
- bid size;
- offer price;
- offer size;
- relationships among bids, offers, net asset value proxies and net asset values available, calculated or to be calculated from at least one of bids, offers and recently executed trades in portfolio components or benchmarks for said exchange-listed financial instrument; and
- structural features of the markets.

36. The article of manufacture of claim 26, further comprising computer readable program code for:
- transmitting the order to one or more selected markets to obtain best execution measured by an expected or specified difference between a projected execution price and at least one of:
- a net asset value proxy;
- a net asset value to be calculated by, or on behalf of, an issuer of the financial instrument;
- another net asset value calculation appropriate for such comparisons in at least one of the markets; and
- another price or value calculation.

37. The article of manufacture of claim 26, further comprising computer readable program code for:
- hedging systematic or beta risks and risks of timing differences between conventional and net asset value based executions using correlated instruments.

* * * * *